US010962454B2

(12) United States Patent
Musat

(10) Patent No.: US 10,962,454 B2
(45) Date of Patent: Mar. 30, 2021

(54) METHODS AND SYSTEMS FOR PREPARING CYTOLOGICAL SAMPLES

(71) Applicant: Leavitt Medical, Inc., Lehi, UT (US)

(72) Inventor: Sorin Musat, Bucharest (RO)

(73) Assignee: Leavitt Medical, Inc., Lehi, UT (US)

( * ) Notice: Subject to any disclaimer, the term of this patent is extended or adjusted under 35 U.S.C. 154(b) by 109 days.

(21) Appl. No.: 16/523,904

(22) Filed: Jul. 26, 2019

(65) Prior Publication Data
US 2020/0033238 A1 Jan. 30, 2020

Related U.S. Application Data

(60) Provisional application No. 62/711,518, filed on Jul. 28, 2018.

(51) Int. Cl.
*G01N 1/14* (2006.01)
*G01N 1/31* (2006.01)
*G01N 1/40* (2006.01)
*C12M 1/28* (2006.01)
*G01N 33/50* (2006.01)

(52) U.S. Cl.
CPC .............. *G01N 1/31* (2013.01); *G01N 1/14* (2013.01); *G01N 1/40* (2013.01); *G01N 2001/1418* (2013.01)

(58) Field of Classification Search
CPC .. G01N 1/14; G01N 1/31; G01N 1/40; G01N 1/4077; G01N 1/42; G01N 2001/1418; G01N 2001/4088; G01N 33/5091
See application file for complete search history.

(56) References Cited

U.S. PATENT DOCUMENTS

| 5,160,704 | A | 11/1992 | Schluter |
| 6,890,729 | B2 | 11/2005 | Mielzynska et al. |
| 9,851,349 | B2 | 12/2017 | Musat |
| 2005/0272103 | A1 | 12/2005 | Chen |
| 2011/0062087 | A1 | 3/2011 | Kaufman et al. |
| 2013/0316347 | A1* | 11/2013 | Brechot .......... A61P 35/04 435/6.11 |
| 2017/0059460 | A1* | 3/2017 | Jeon .................. A61M 1/341 |
| 2017/0131191 | A1 | 5/2017 | Pugia et al. |
| 2018/0226138 | A1 | 8/2018 | Leavitt |

OTHER PUBLICATIONS

International Search Report and Written Opinion of the International Searching Authority, dated Oct. 11, 2019, International Application No. PCT/US19/043793.
As-Filed Claims of International Application No. PCT/US19/043793.

* cited by examiner

*Primary Examiner* — Jennifer Wecker
(74) *Attorney, Agent, or Firm* — FisherBroyles, LLP

(57) ABSTRACT

The disclosed methods for preparing cytological samples may include placing a cytological sample in a concave filter in a filtration system, applying a negative pressure to an outer side of the concave filter with a vacuum device to withdraw a liquid from the cytological sample, applying a sectionable matrix material over the filtered cellular material within the concave filter, and removing an assembly including the filtered cellular material and the sectionable matrix material from the filtration system. Various other related methods, systems, and materials are also disclosed.

11 Claims, 20 Drawing Sheets

METHODS AND SYSTEMS FOR PREPARING CYTOLOGICAL SAMPLES

CROSS-REFERENCE TO RELATED APPLICATION

This application claims priority to U.S. Provisional Patent Application No. 62/711,518, titled "METHODS AND SYSTEMS PREPARING CYTOLOGICAL SAMPLES," filed 28 Jul. 2018, the entire disclosure of which is incorporated herein by reference.

BACKGROUND

Cytopathology is screening and/or diagnosing diseases by looking at single cells and small clusters of cells. The cells for cytopathology can be obtained in a variety of ways. For example, fine needle aspiration (FNA) may be performed to obtain cells from virtually any organ. Body fluids may also be collected, such as urine, sputum, cerebrospinal fluid (CSF), pleural fluid, pericardial fluid, or ascitic (peritoneal) fluid. Conventional cell collection techniques also include scraping or brushing cells from an organ or tissue, such as from a uterine cervix (e.g., for a Pap test), an esophagus, a stomach, bronchi, a mouth, etc.

Compared with typical tissue biopsies, cytology specimens are sometimes cheaper, easier to harvest with less discomfort to the patient, and are less likely to result in serious complications. However, in some cases, a tissue biopsy result may be more accurate.

Cytomorphologic diagnoses can be rendered by staining smears, cytospins following specimen concentration, thin layer preparations with selective cellular enhancement, and cell blocks prepared for sample consolidation.

Because of a low concentration of cells in samples taken, smears, cytospins, and thin layer preparations used for screening/diagnoses are often low yield, "single-use," and, when multiple slides are prepared for eventual future ancillary tests, have a limited shelf life.

In some situations, cell blocks have potential advantages of semblance to histology and the capacity to yield multiple tissue sections for ancillary tests (e.g., special stains, immunohistochemical (IHC) stains with coordination of immunoreactivity pattern, molecular diagnostics, etc.). Additionally, most conventional ancillary tests are standardized only for samples prepared using histological techniques (not cytological) and, as such, cell block preparations can yield results that can be automatically validated for clinical use (as opposed to cytological preparations where many ancillary tests can either not be performed at all, or results will have only a conjectural value). For example, immunohistochemical staining is validated on formalin-fixed, paraffin-embedded (FFPE) tissue samples, but is generally not validated for alcohol-fixed or air-dried smears or cytospins.

Conventional methods for preparing cell blocks may involve a preliminary step of concentrating the cells by centrifugation and/or filtration. Some methods use a liquid matrix for holding the loose cells together (e.g., albumin, gelatin, plasma thrombin, low melting point agarose, proprietary mixtures such as so-called "HistoGel" available from Thermo Fisher Scientific Inc. of Waltham, Mass., USA, etc.). It is difficult or impossible to obtain a homogenous mixture of cells in a liquid matrix while maintaining the integrity of the cells for later analysis. As a result, while some of the sections obtained from a cell block might contain large concentration of cells, other sections could be devoid of cells or have a low concentration of cells.

Some have attempted to simply wrap a group of concentrated cells (e.g., a cell pellet) in lens paper, in a tea bag, or in a collodion membrane prior to histological processing. Alternatively, all processing (e.g., including embedding in paraffin wax) can be performed in centrifuge tubes that are cut at the bottom for extracting the paraffin block. Such methods typically suffer from a lack of standardization, are cumbersome and inefficient, and do not completely eliminate the risk of cross-contaminating the samples. Moreover, the preparative steps involved in processing in the centrifuge tubes may run the risk of losing a significant number of cells and are not suitable for samples with low cellularity (i.e., low concentration of cells).

One conventional method used by HOLOGiC® (e.g., the method associated with the trade name CELLIENT AUTOMATED CELL BLOCK SYSTEM®) is relatively simple, but results in obtaining extremely thin blocks which are often difficult to cut. In addition, the method may be inefficient because it typically allows only individual processing of the preparations, spanning approximately 45 minutes per specimen. The method also requires dedicated and expensive equipment, which translates into a relatively low efficiency at a high price.

Other drawbacks of the traditional methods for obtaining cell blocks may include high loss of sometimes very scarce (e.g., low concentration) cellular material during complex and time-consuming preparative steps. Additionally, certain incompatibilities may exist with regard to the fixatives employed. For example, the so-called "thrombin clot" method generally may not employ the use of formalin-fixed samples, and the HistoGel method is not designed to work without post-fixation in formalin, etc. Such requirements may limit the applicability of such methods to molecular testing, which is typically the main driver for employing cell block techniques.

SUMMARY

In some embodiments, the present disclosure includes methods for preparing cytological samples. In accordance with such methods, a cytological sample may be placed in a concave filter in a filtration system. A negative pressure may be applied to an outer side of the concave filter with a vacuum device to withdraw a liquid from the cytological sample and to maintain a filtered cellular material on an inner surface of the concave filter. A sectionable matrix material may be applied over the filtered cellular material within the concave filter. An assembly including the filtered cellular material and the sectionable matrix material may be removed from the filtration system.

In some examples, applying the sectionable matrix material over the filtered cellular material may include applying a liquid or molten sectionable matrix material over the filtered cellular material. The sectionable matrix material may be hardened to form the assembly including the filtered cellular material and the sectionable matrix material. In additional examples, applying the sectionable matrix material over the filtered cellular material may include applying a pre-formed and pre-shaped sectionable matrix material over the filtered cellular material.

In some examples, a lower sectionable matrix material may be positioned under the concave filter prior to applying the negative pressure to the outer side of the concave filter. The lower sectionable matrix material may include channels extending between opposing surfaces thereof. The application of the negative pressure to the outer side of the concave filter may include applying the negative pressure through the channels in the lower sectionable matrix material. In some examples, an additional concave filter may be positioned over the filtered cellular material prior to applying the sectionable matrix material over the filtered cellular material.

In some embodiments, the present disclosure includes systems for preparing cytological samples. Such systems may include a filter cavity shaped and sized for receiving a concave filter and a cytological sample within a cavity of the concave filter. A vacuum device may be in fluid communication with the filter cavity. The vacuum device may be configured to apply a negative pressure to an outer surface of the concave filter.

In some examples, such systems may include a cooling device that is configured to withdraw heat from a material within the filter cavity. The filter cavity may include a bottom surface, and the bottom surface may include at least one recess for applying the negative pressure to the outer surface of the concave filter. The recess may include a spiral recess. The recess may be in fluid communication with a hole extending through the bottom surface of the filter cavity. The vacuum device may be in fluid communication with the hole to apply the negative pressure through the hole. The systems may also include a funnel that is positioned, shaped, and configured to direct the cytological sample into the filter cavity. The concave filter may include a handle portion.

In some embodiments, the present disclosure includes sectionable matrix materials for processing cytological samples. Such sectionable matrix materials may include a bottom surface, a central depression on a side of the sectionable matrix material opposite the bottom surface, and a plurality of channels extending through the sectionable matrix material from an inner surface of the central depression to the bottom surface. The central depression may be shaped and sized to receive a concave filter. The channels may be shaped and sized for applying a negative pressure across the sectionable matrix.

In some examples, at least some of the channels may differ in at least one of cross-sectional shape and/or cross-sectional size. At least one of the channels may have a rectangular cross-section and at least one other of the channels may have a circular cross-section. A material of the sectionable matrix material may include an applied pigment. At least one radial recess may extend outward from the central depression.

DETAILED DESCRIPTION

Figure 1:
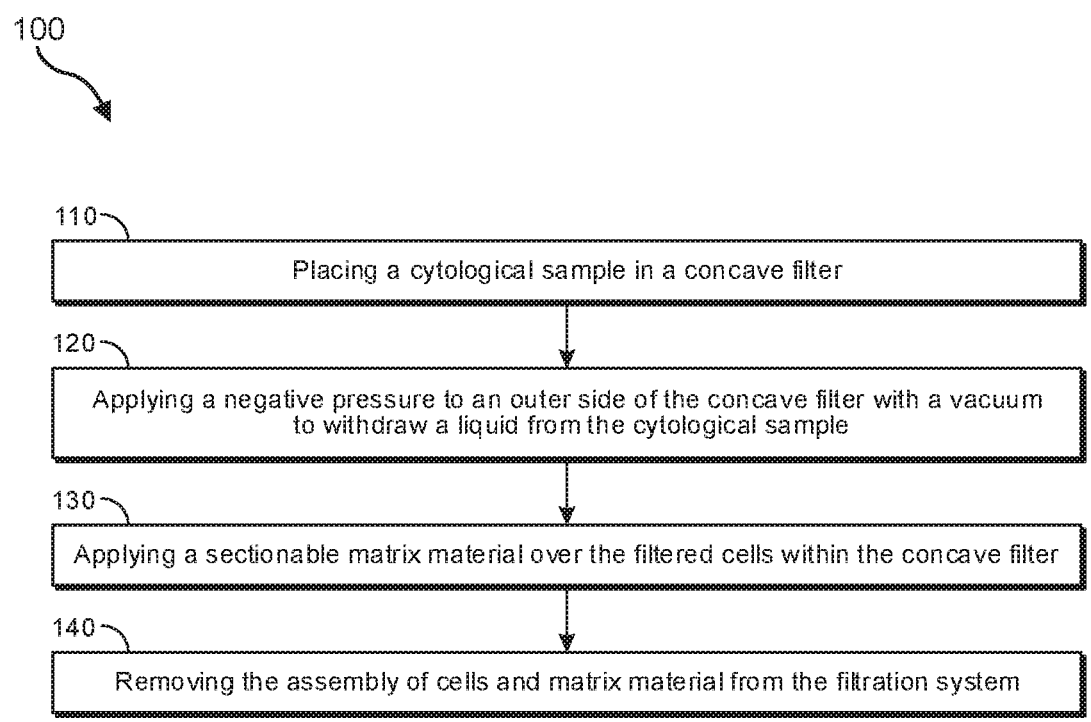
FIG. 1 is a flow diagram illustrating an example method for preparing cytological samples for histological processing.

The present disclosure provides methods and systems for preparing cytological samples for testing and diagnoses in histological and pathological procedures. In some embodiments, the disclosed methods may include providing a concave-shaped filter within which cytological samples are collected. A vacuum device may apply a negative pressure to withdraw liquid from the sample, leaving cellular material within and along an internal surface of the concave filter. The cellular material may be distributed along a bottom of the filter and along sidewalls of the filter. A liquid matrix material may be provided over the cellular material within the concave filter, and the matrix material may be hardened (e.g., gelled or solidified) either chemically or by cooling the liquid matrix material, such as with an appropriately shaped metal tamper. One example suitable sectionable matrix material that may be used with embodiments of the present disclosure is described in U.S. Pat. No. 9,851,349, titled "MATRIX FOR RECEIVING A TISSUE SAMPLE AND USE THEREOF," issued on Dec. 26, 2017 (hereinafter "the '349 Patent"), the entire disclosure of which is incorporated herein by reference. Additional examples of liquid matrix material include wax or another material that may be sectioned in a resulting cell block. A resulting assembly of the cells and hardened matrix material may be obtained for further histological processing (e.g., one or more of: fixation, dehydration, embedding, sectioning, staining, multiplexing, or slide preparation, etc.) and pathological analysis.

In some embodiments, the filter may initially be substantially planar and may be formed into a concave shape as a result of the filtration step. By way of example and not limitation, a pre-folded filter may be configured to transition from a generally planar, folded initial shape to an unfolded concave shape during filtration.

In some examples, the filter (e.g., either initially concave or to be transitioned into a concave shape, as noted above) may be positioned over a concave sectionable pre-gelled lower matrix material. The lower matrix material may include a number of channels passing from an inner concave surface to a bottom outer surface of the lower matrix material. An initially liquid sectionable matrix material may be applied over the filtered cellular material and may be hardened (e.g., gelled or solidified), as described above. The resulting matrix and cellular assembly, including the lower matrix material, filter, cellular material, and hardened upper matrix material, may be submitted for further histological processing (e.g., one or more of: fixation, dehydration, embedding, sectioning, staining, multiplexing, or slide preparation, etc.) and pathological analysis.

Alternatively or additionally, a pre-solidified (e.g., pre-gelled) and pre-shaped convex upper matrix material may be positioned over the filtered cellular material within concave portion of the lower matrix material. The matrix and cellular assembly, including the lower matrix material, filter, cellular material, and pre-gelled upper matrix material may be submitted for further histological processing (e.g., one or more of: fixation, dehydration, embedding, sectioning, staining, multiplexing, or slide preparation, etc.) and pathological analysis. In some embodiments, the pre-shaped sectionable matrix material may be or include wax, proteins, lipids, a combination thereof, or any other suitable matrix material that may be sectioned from a resulting cell block together with the cellular material.

Alternatively or additionally, prior to disposing an upper matrix material (e.g., an initially liquid upper matrix material or a pre-gelled upper matrix material) over the filtered cellular material, an additional filter may be positioned over the filtered cellular material. The upper matrix material may then be positioned over the additional filter, and the assembly may be submitted for further histological processing (e.g., one or more of: fixation, dehydration, embedding, sectioning, staining, multiplexing, or slide preparation, etc.) and pathological analysis.

Alternatively or additionally, in some examples, an initially liquid matrix material may be positioned over the assembly that includes the upper matrix material, additional filter, filtered cellular material, concave filter, and lower matrix material assembly and may be hardened (e.g., gelled or solidified, such as chemically or thermally). In this manner, assembly including the upper matrix material, additional filter, filtered cellular material, concave filter, and lower matrix material may be sealed and held in place securely.

The methods and systems described in the present disclosure may enable the obtaining of cell blocks from cell suspensions (e.g., low cellularity samples) with low- to substantially zero-cell losses during the preparative steps. In addition, the disclosed methods may be performed faster than some conventional techniques and may be compatible with all fixatives that are typically employed in cytopathology. In addition, embodiments of the disclosed methods and systems may be compatible with microwave-assisted tissue processing, cryo-sectioning, and other histological procedures. The cellularity of the slides resulting from embodiments of this disclosure may be predictable and controllable. Cross-contamination may be inhibited (e.g., reduced or eliminated) by containing all cells within the concave filter when the assembly of cells and matrix material is removed for histological processing. The methods and systems may be cost-effective, particularly when compared with certain conventional methods. The resulting assemblies of cells and matrix material may enable or facilitate multiplexing, and sectionable code or other identifiers may be used with the assemblies for identification and standardized processing of the cytological samples.

FIG. 1 is a flow diagram illustrating an example method for preparing cytological samples for histological processing. As shown at operation 110, in some examples of the present disclosure, a raw or prefixed cytological sample may be placed in a cavity of a concave filter (e.g., a membrane including cellulose acetate, cellulose nitrate, and/or mixed esters of cellulose) in a filtration system. The concave filter may have, for example, a porosity of 0.11 microns, 0.22 microns, 0.45 microns, 3 microns, 5 microns, 8 microns, or another suitable porosity. The porosity of the filter may be selected depending on a type of liquid being processed, a known cell size (e.g., to be smaller than the known cell size), etc. Prior to this primary filtering, a preliminary concentration (e.g., using a centrifuge or another filter) can be performed, such as for a high-volume, low cellularity (e.g., "thin" or "watery") samples. Optionally, cellular samples with undesirable characteristics (e.g., high protein content, the presence of mucus, the presence of blood, etc.) may be cleaned, purified, concentrated, etc. The porosity, diameter of the filter, radius of the cavity, and depth of the filter can be adjusted or selected depending on the type of cytology specimen being processed. The filter may be pre-formed to exhibit a concave shape or may be pre-folded to result in a concave shape when a low pressure is applied below the filter. In some examples, the filter may be positioned in or over a concave cavity in a pre-formed, sectionable lower matrix material. The lower matrix material may include channels extending from an inner concave surface of the cavity to a bottom surface thereof for applying a negative pressure to the concave cavity for filtration.

As shown at operation 120, a vacuum device (e.g., a pump) may apply a negative pressure to an outer side of the concave filter (e.g., through the channels in the lower matrix material) to withdraw a liquid from the cytological sample, while depositing the cells within the sample on inner surfaces of the filter. The level of the applied negative pressure may be selected to at least maintain an integrity of the cells. At the same time, the level of the applied negative pressure may be selected to result in a reasonably fast filtration, such as for efficient processing and cell block preparation.

The filtered cells may tend to generate a thin layer of filtered cells formed on internal surfaces of the concave filter. The layer of filtered cells may be slightly thicker at the bottom of the cavity or near a top of the cavity, depending on a buoyancy or mass of the cells and/or on a distribution of channels in a pre-formed lower matrix material below the filter, and/or the level of vacuum applied for example. The concave shape of the filter may enable a distribution of the cells that facilitates obtaining multiple sections of a resulting cell block that each contains cells therein for processing and analysis. For example, the cellular material may be distributed substantially evenly along an inner surface of the concave filter.

As a part of subsequent histological processing, a resulting assembly of the matrix material, the filter, and the filtered cellular material may be sectioned. By providing the filtered cellular material in a substantially even distribution along the concave inner surface of the filter, each section obtained may include sufficient cellular material for useful examination by a pathologist, as will be explained further below. This may enable the use of relatively few sections for review by a pathologist, while leaving additional portions of the assembly for further processing as may be desired, and/or while providing additional sections for different processing techniques (e.g., by application of a different histological stain, etc.). In some examples (e.g., depending on the characteristics of the cytological sample to be examined), the methods and systems described herein may result in a plurality of usable sections, each of which may include at least fifty, at least one hundred, at least two hundred, at least three hundred, at least four hundred, or at least five hundred visible cells for review by the pathologist. In some embodiments, at least twenty, at least fifty, at least one hundred, or at least two hundred sections each having such a suitable number of visible cells may be obtained from a single assembly of matrix material, filter, and filtered cellular material.

As shown at operation 130, after the liquid or a sufficient portion of the liquid of the cytology specimen is removed via the applied negative pressure, a sectionable matrix material may be applied over the filtered cells within the concave filter. By way of example, a liquid or molten sectionable matrix material may be applied over the filtered cells within the concave filter, such as until the cavity is substantially full with a slight meniscus. In some examples, the temperature of the molten sectionable matrix may be maintained below about 60 degrees Celsius to prevent denaturation of proteins present in the cell sample (which may nullify a downstream diagnostic value of the sample). Various sectionable matrix materials may be used, but the fluidity and solidification speed may be appropriately tuned such that, before solidification is complete, the matrix will encapsulate substantially all cells or cellular aggregates, tissue fragments, or other material of interest that may be present on the concave filter. After hardening, the initially liquid matrix material applied over the filtered cells may form an upper matrix material.

By way of another example, a pre-gelled and pre-shaped upper matrix material may be applied over the filtered cells within the concave filter. For example, the upper matrix material may be molded or otherwise formed to have a convex shape that is complementary to a concave region of the filter and/or to the underlying lower matrix material, if present, Example pre-formed upper matrix materials are further described below.

Whether initially liquid or pre-gelled, one suitable example sectionable matrix material that may be used in the disclosed methods and systems (e.g., as the lower matrix material and/or as the upper matrix material) is described in the '349 Patent.

In embodiments in which the upper matrix material includes an initially liquid material, after the liquid or molten matrix material is applied, the sectionable matrix material may be hardened (e.g., solidified or gelled), to form an assembly of cells and matrix material. For example, a cooling device, such as a chilled tamper, may be applied on top of the liquid-filled cavity and held in position until the sectionable matrix sufficiently gels or solidifies. The temperature of the tamper may initially be (or may be maintained) at or above about zero degrees Celsius for preventing damage to the cells, such as may otherwise result from freezing and/or cracking of the cells. By tuning the composition of the sectionable matrix, gelling times of about fifteen seconds to about 2 minutes or less may be attainable, depending on the size of the cell block. Additionally, or alternatively, the matrix may be of a type that is solidified or gelled in another way, such as by a chemical reaction.

As shown at operation 140, the assembly of cells and sectionable matrix may be removed from the filtration system. The assembly may then be histologically processed, such as using a method wed-known to the person skilled in the art. In some embodiments, the cell block prepared from pre-fixed cells can proceed directly to a dehydration step without any additional fixation (e.g., in formalin). Moreover, the assembly obtained using the disclosed method can be also employed for cryo-sectioning (i.e., without any fixation, dehydration, clarification, and paraffin embedding)

During embedding of the cell blocks (e.g., in paraffin wax), the assembly of cells and sectionable matrix can be oriented either with the lower matrix material or the upper matrix material down (e.g., to be sectioned first). Additionally or alternatively, the assembly may be bisected, trisected, etc., depending on its size and/or on future diagnostic applications envisioned by a diagnostician.

The assembly may be submitted for further histological processing (e.g., one or more of: fixation, dehydration, embedding, sectioning, staining, multiplexing, or slide preparation, etc.) and pathological analysis. At least some resulting slides formed by sectioning the processed assembly may display a rim of cells at a periphery of the sectionable matrix (e.g., sandwiched between the filter if it was maintained in place and the sectionable matrix, sandwiched between two filters, etc.) or a disc of cells, substantially devoid of sectionable matrix (except for potentially a thin layer encapsulating individual cells or cellular aggregates). If the filter was retained in the block, the filter may be present as a ring around the disc of cells. If a pre-formed (e.g., pre-gelled) upper matrix material is employed without applying a liquid upper matrix material to the filtered cellular material, the cells may not be encapsulated by the matrix material.

If desired, the cell blocks—or fragments of them (before or after sectioning)—can be multiplexed, such as in an appropriately shaped receptacle formed of a sectionable matrix, as described in the '349 Patent or including wax or another sectionable matrix material. Thus, multiple cell blocks or cell block fragments (e.g., from the same patient or from different patients) can be processed together in a same sectionable matrix receptacle. The sectionable matrix receptacle may have features (e.g., sectionable code, measurement marks, dividers, depth gauges, identifiers, etc.) that may enable separation and/or identification of the cell blocks or fragments. Example systems and methods that may be suitable for providing sectionable matrix receptacles with such features are described in the disclosure of U.S. patent application Ser. No. 15/893,061, titled "Systems and Methods for Tissue Sample Processing," filed on Feb. 9, 2018, published as U.S. Patent Application Publication No. 2018/0226138, the entire disclosure of which is incorporated herein by reference.

By way of example, the position and distribution of channels passing through the lower matrix material may serve as a pre-determined pattern (e.g., a grid) for three-dimensional reconstruction of the distribution of the assembly of cells and matrix material. Such reconstruction may facilitate the process of microtome sectioning of a resulting cell block and may reduce (e.g., eliminate) a risk of generating and presenting sections devoid of cells or of removing too much material from the cell block and losing cellular material. Individual serial sections obtained from the resulting cell block may be stained and examined under a microscope, and/or images (e.g., digital images) may be obtained and archived for later examination. The location, shape, and/or distribution pattern of the channels extending through the lower matrix material may be visible on the resulting slides, which may enable the reviewer (e.g., a pathologist) to ascertain the depth within the cell block at which a particular section was taken. Additionally, by providing the channels in a predetermined pattern (e.g., shape, distribution, size, etc.), the channels will appear in the stained sections as unstained holes. Thus, tracking and tracing various histological features may be facilitated by the presence and configuration of the channels in the lower matrix material. Example configurations of channels in the lower matrix material are further described below.

In some embodiments, a variety of pigments (e.g., colors, fluorophores, etc.) may be employed for distinguishing the lower matrix material, the upper matrix material, or both of the lower and upper matrix materials from each other and/or from the cellular material. By way of example, this may facilitate identifying a depth at which a particular section was taken, and may reduce (e.g., eliminate) producing slides having sections that are devoid of cellular material. Additionally or alternatively, such distinguishing stains may reduce a risk of removing too much material from the cell block and, therefore, losing cellular material from the cell block. In some embodiments, a backlight may further facilitate the proper obtaining and use of sections from the cell block, by highlighting pigment differences between the lower matrix material, the upper matrix material, and/or the filtered cellular material.

The multiplexing can be done prior to fixation or during embedding, for example. The sectionable matrix may be in the same stage of the processing protocol as the cell block to be multiplexed. In addition to providing sectionable matrix receptacles with sectionable code, other methods of identifying certain cell blocks can be envisioned, for example, using color-coded liquid matrices, color-coded multiplexing matrices, RFIDs, etc. If desired, after sectioning the multiplexed cell blocks, each individual cell block can be removed from the sectionable matrix material and multiplexed or processed/tested individually again, in another configuration.

Embodiments of the multiplexing procedures described in the present disclosure may provide a number of benefits over conventional methods, such as cost and time efficiencies. The multiplexing may be facilitated by the methods and systems of the present disclosure by providing the cell blocks in a standardized size, shape, and configuration, which may be placed into standardized sectionable matrix receptacles for ease of processing, identification, and handling. In addition, the number of sections that may be obtained from the cell blocks generated using the systems and methods described in the present disclosure may be higher (e.g., substantially higher) than conventional methods, due to the concave shape of the filter used to form the cell blocks.

Testing of the presently disclosed systems and methods was completed with a cytological sample including about 41,800 cells (immortalized kidney epithelial cells) suspended in a 0,250 ml solution and filtered through a concave filter having a concave cavity diameter of about 8 mm and a cavity depth of about 2.5 mm, with a porosity of 5 microns. The resulting paraffin block generated in excess of 250 serial sections taken at about 5-micron intervals, Each $25^{th}$ section was stained and all cells present were counted under the microscope at a 400× magnification. The following values were recorded (counts/number of section): 682/1st, 388/$25^{th}$, 293/$50^{th}$, 190/$75^{th}$, 122/$100^{th}$, 271/$125^{th}$, 266/$150^{th}$, 141/$175^{th}$, 73/$200^{th}$, 101/$225^{th}$, and 84/$250^{th}$. It is evident that these counts could suggest that the number of cells present on the filter (and by way of consequence in the paraffin sections) is slightly larger than the cells that were deposited on the surface of the filter. However, some cells may be intercepted during microtome sectioning in more than one section (depending on the size of cell in 2, 3, or even more successive sections), However, the number of cells lost during obtaining a cell block by employing the presently disclosed methods and systems is virtually nil.

Figure 2:
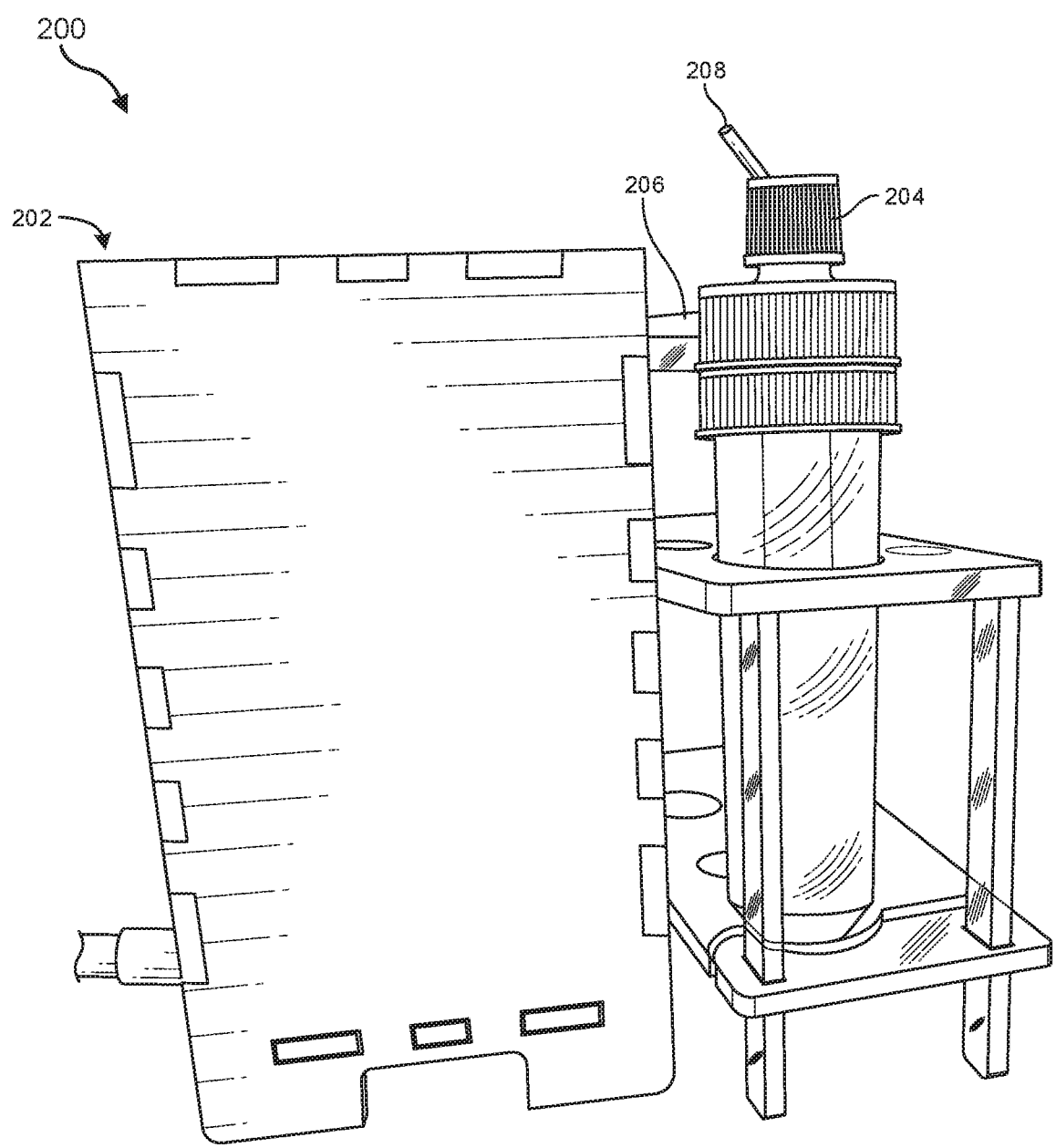
FIG. 2 is a side perspective view of a system for preparing cytological samples according to at least one embodiment of the present disclosure.
Figure 3:
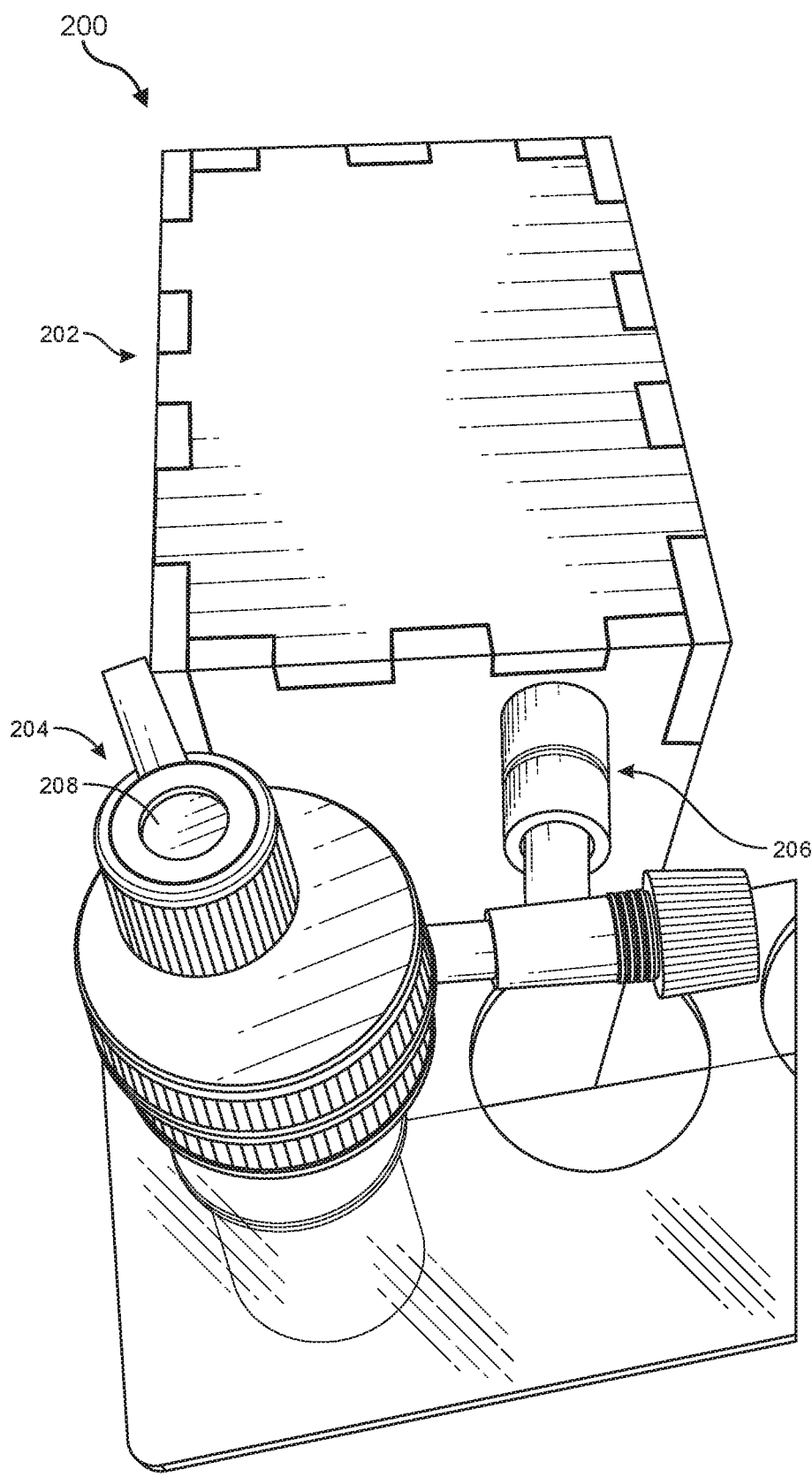
FIG. 3 is an upper perspective view of the system of FIG. 2.
Figure 4:
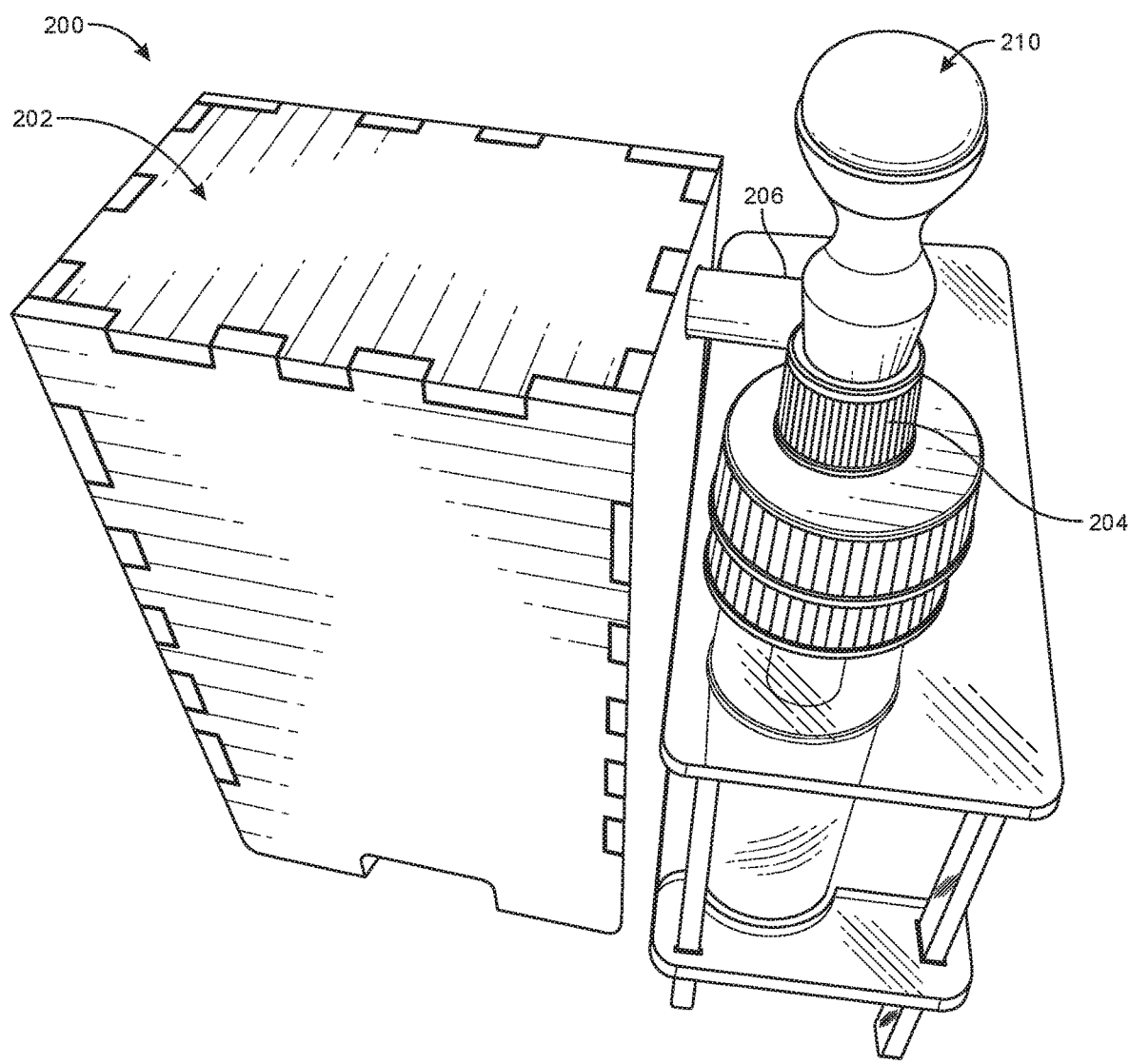
FIG. 4 is another perspective view of the system of FIG. 2, with a cooling device applied.

FIG. 2 is a side perspective view of a system 200 (e.g., a filtering system) for preparing cytological samples, such as for further histological processing, according to embodiments of the present disclosure. FIG. 3 is an upper perspective view of the system 200 of FIG. 2. FIG. 4 is another perspective view of the system 200 of FIG. 2, with a cooling device applied.

Referring to FIGS. 2-4, the system 200 may include a vacuum device 202 (e.g., a pump), a filtering chamber 204, and a conduit 206 fluidly coupling the vacuum device 202 to the filtering chamber 204. The filtering chamber 204 may be shaped and sized for receiving a concave filter 208. FIG. 4 also shows a cooling device in the form of a chilled tamper 210 (e.g., including a metallic material) in place over the filtering chamber 204, which may be chilled and applied for hardening an initially liquid upper matrix material that may be applied to the filtering chamber 204 and over a cellular material after filtering. In some examples, the tamper 210 may have a generally planar lower surface for contacting and hardening the upper matrix material. In additional examples, the tamper 210 may have a convex lower surface, which may be complementary to a concave cavity formed in the concave filter 208.

Figure 5:
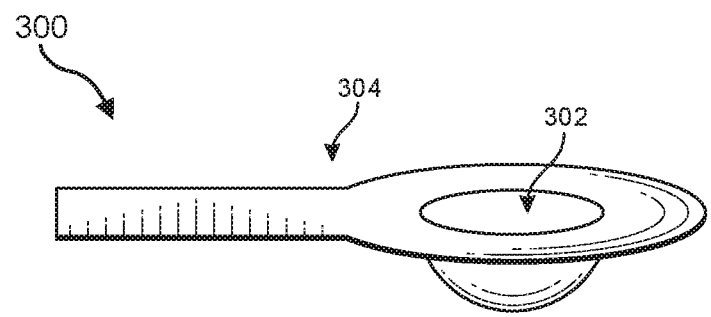
FIG. 5 is a side perspective view of a concave filter according to at least one embodiment of the present disclosure.

FIG. 5 is a side perspective view of an example concave filter 300 according to the present disclosure. For example, the concave filter 300 may include a concave portion 302 and a handle portion 304 for installing and removing the concave filter 300 in the filtering chamber 204.

Figure 6:
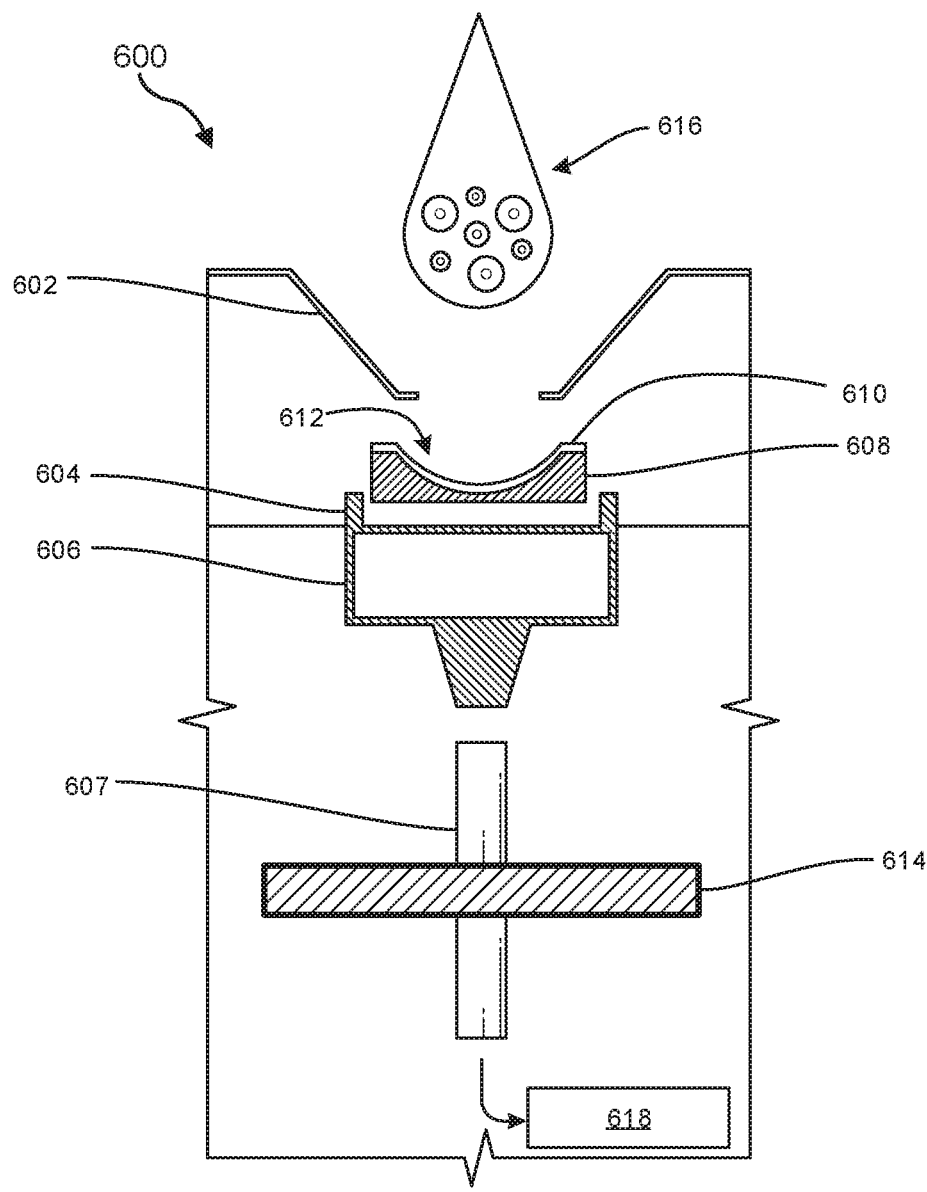
FIG. 6 is a schematic side cross-sectional view of a system for preparing cytological samples, according to at least one additional embodiment of the present disclosure.

FIG. 6 is a schematic side cross-sectional view of a system 600 for preparing cytological samples, according to at least one additional embodiment of the present disclosure. The system 600 may include a funnel 602, a lower matrix material receptacle 604, a filtrate reservoir 606, and a vacuum conduit 607 positioned for applying a negative pressure to the filtrate reservoir 606. The lower matrix material receptacle 604 may be shaped and sized for receiving a pre-formed (e.g., pre-gelled) lower matrix material 608 and a concave filter 610. The lower matrix material 608 may include a concave cavity 612, within which a portion of the concave filter 610 may be positioned prior to a filtering operation. As discussed above and as further discussed below, the lower matrix material 608 may include channels (not shown in the view of FIG. 6) extending from an inner surface of the concave cavity 612 to a bottom surface of the lower matrix material 608.

In some embodiments, a liquid-blocking filter 614 may be positioned across the vacuum conduit 607 to reduce or prevent the passage of liquid or aerosols (e.g., biohazardous solution) from a cytological sample 616 to an associated vacuum device 618 (e.g., a pump), while allowing a gas (e.g., air) to pass. The cytological sample 616 may be or include a cellular material suspended in a liquid, such as water. The funnel 602 may facilitate deposition of the cytological sample 616 over and into the concave filter 610. In some examples, the funnel 602 may be removable from over the concave filter 610, such as to install and remove the lower matrix material 608 and the concave filter 610 relative to the lower matrix material receptacle 604.

Figure 7:
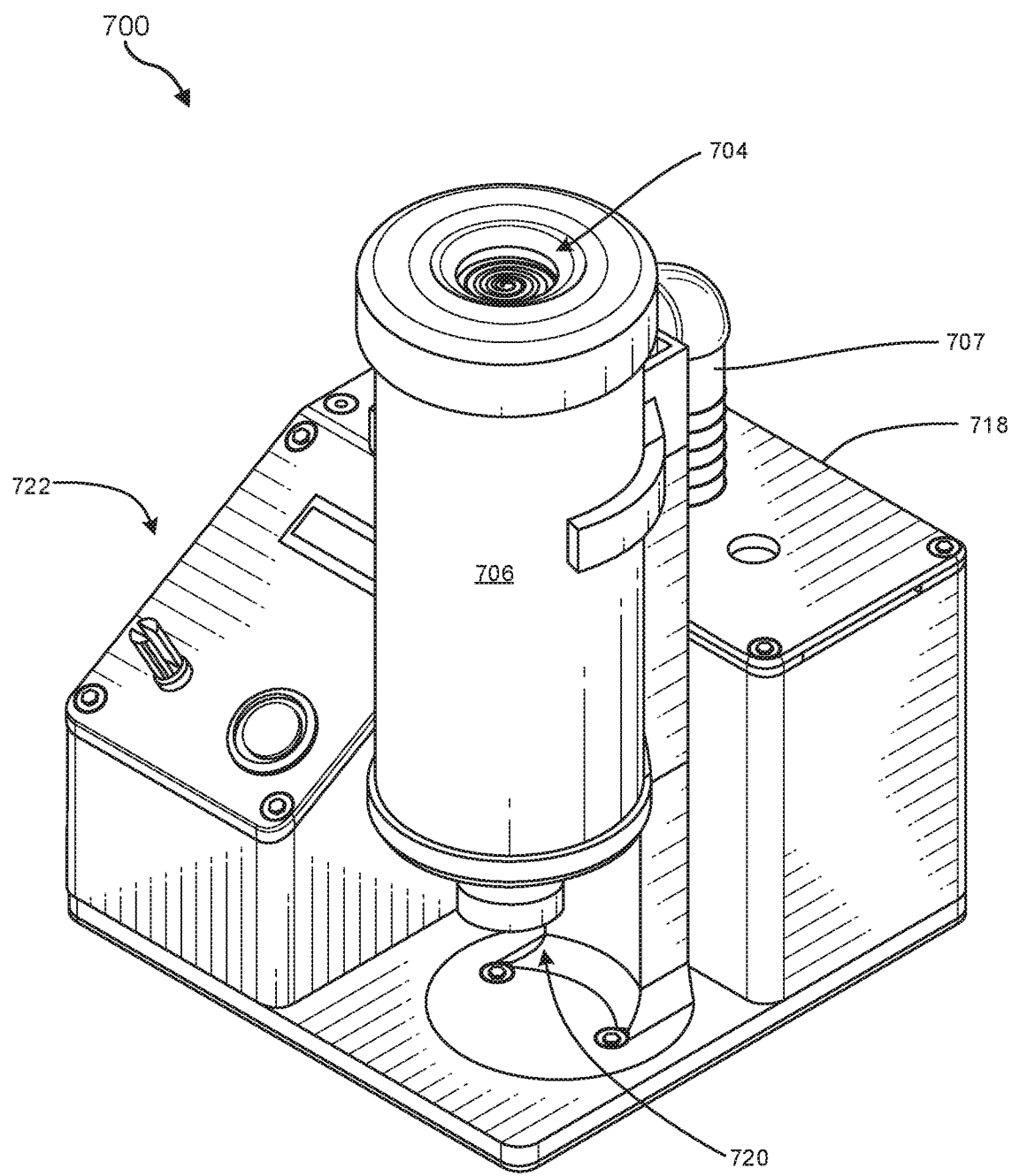
FIG. 7 is a perspective view of a system for preparing cytological samples, according to at least one further embodiment of the present disclosure.
Figure 8:
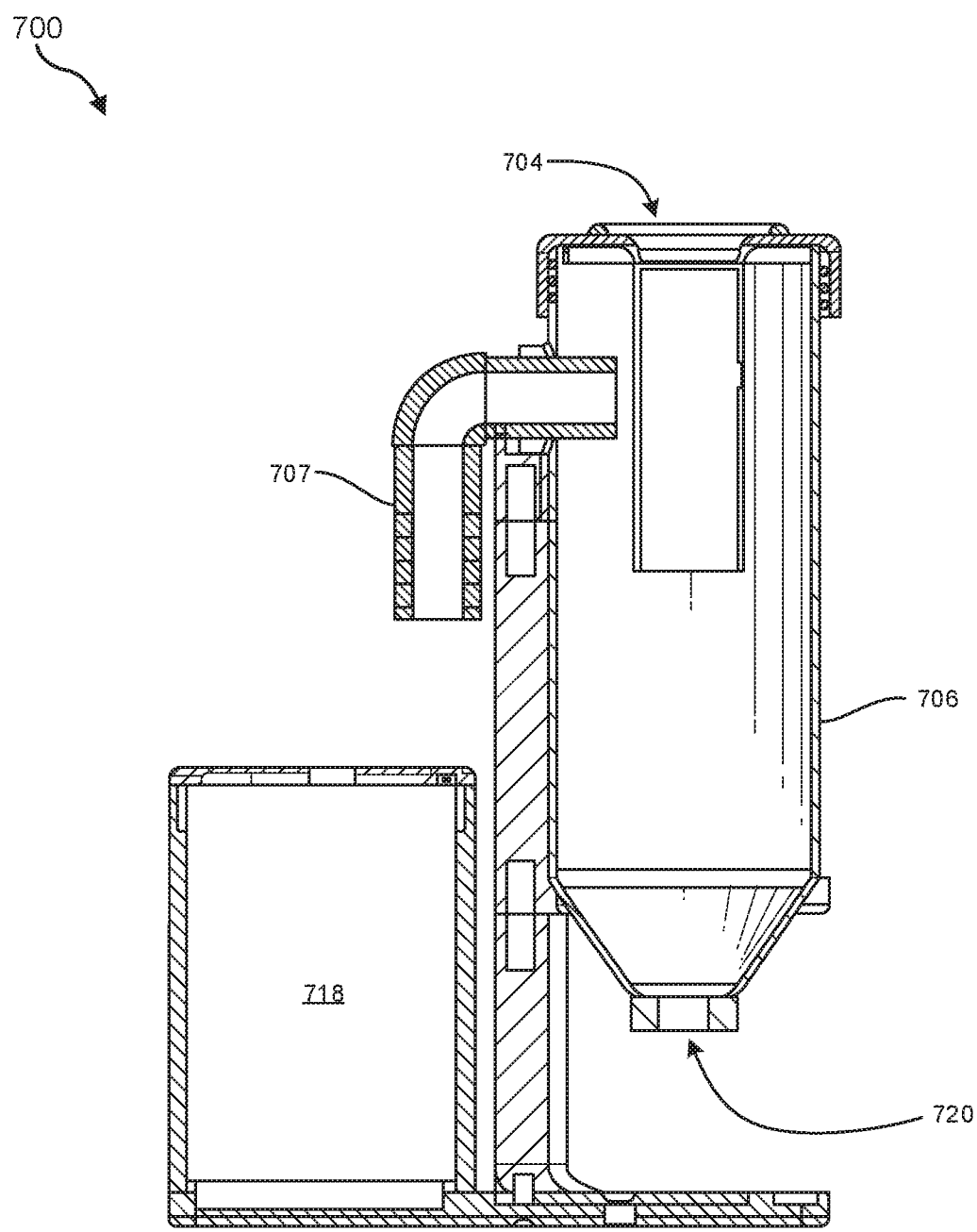
FIG. 8 is a side cross-sectional view of the system of FIG. 7.

FIG. 7 is a perspective view of a system 700 for preparing cytological samples, according to at least one further embodiment of the present disclosure. FIG. 8 is a side cross-sectional view of the system 700 of FIG. 7. Referring to FIGS. 7 and 8, the system 700 may include a lower matrix material receptacle 704 positioned over a filtrate reservoir 706, a vacuum conduit 707 extending from a side of the filtrate reservoir 706, and a vacuum device 718 that may be configured to apply a negative pressure to the filtrate reservoir 706 via the vacuum conduit 707. In addition, the system 700 may include a drain 720 for removing a liquid from the filtrate reservoir 706 after a filtration operation. A control unit 722 may be positioned and configured to control operation (e.g., turn off and on, alter a value of an applied negative pressure, etc.) of the vacuum device 718.

Figure 9:
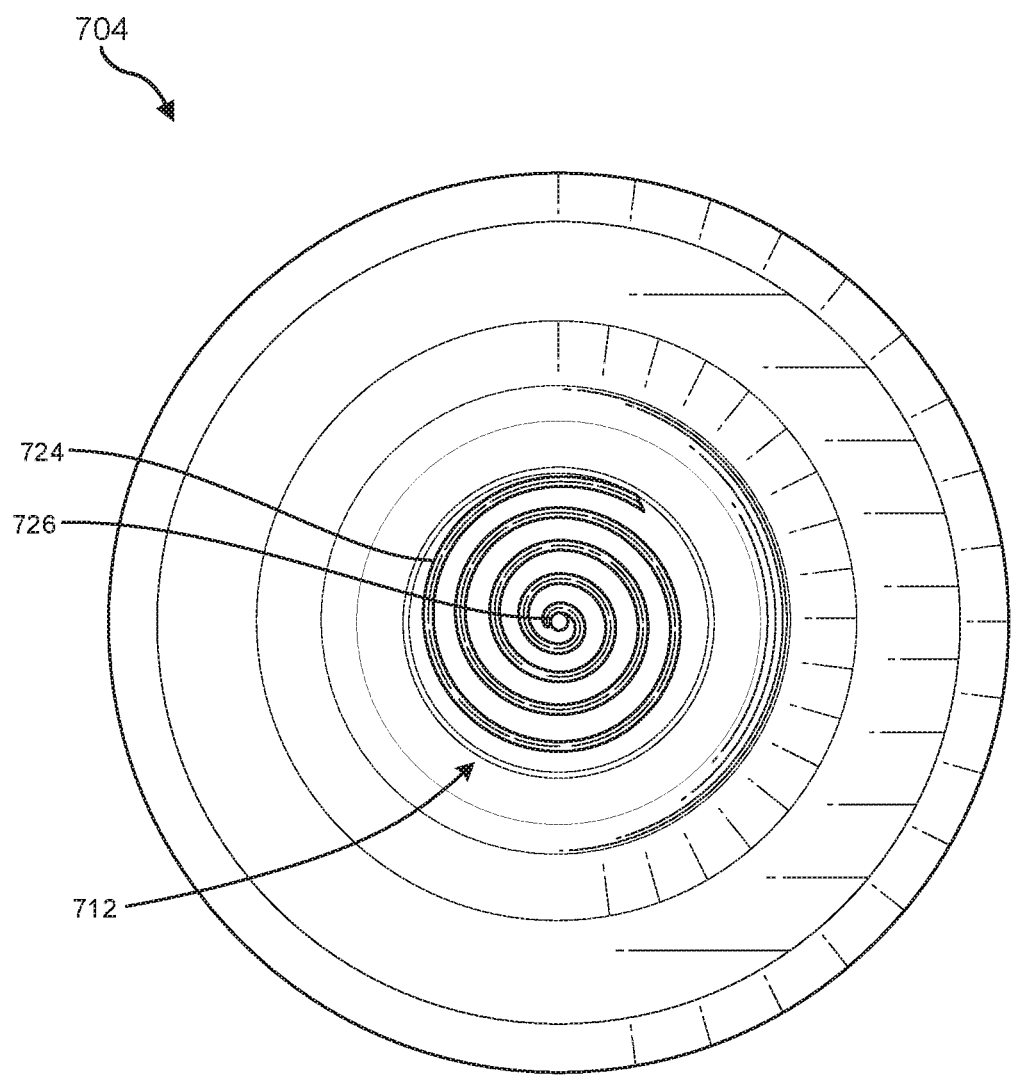
FIG. 9 is a top view of a lower matrix material receptacle of the system of FIG. 7.

FIG. 9 is a top view of the lower matrix material receptacle 704 (also referred to as "receptacle 704" for simplicity) of the system 700 of FIG. 7. As shown in FIG. 9, an inner surface of the receptacle 704 within a concave cavity 712 of the receptacle 704 may include at least one recess 724. For example, the recess 724 may have a spiral configuration. Other configurations are also suitable, such as radially extending recesses 724, concentric recesses 724, etc. The recess 724 may provide fluid communication between channels formed in a lower matrix material positioned within the recess 724 and at least one hole 726 extending through the receptacle 704. In this manner, a negative pressure may be applied by the vacuum device 718 (FIGS. 7 and 8) through the channels via the recess 724 and the hole 726. At the same time, portions of the receptacle 704 between portions of the recess 724 may physically support a corresponding lower matrix material positioned within the recess 724.

Figure 10:
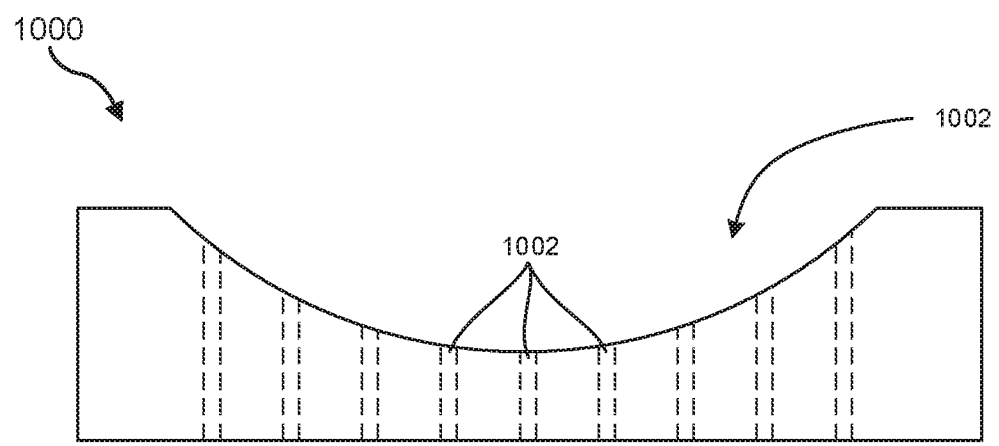
FIG. 10 is a side cross-sectional view of a lower matrix material for use with systems for preparing cytological samples, according to at least one embodiment of the present disclosure.
Figure 11:
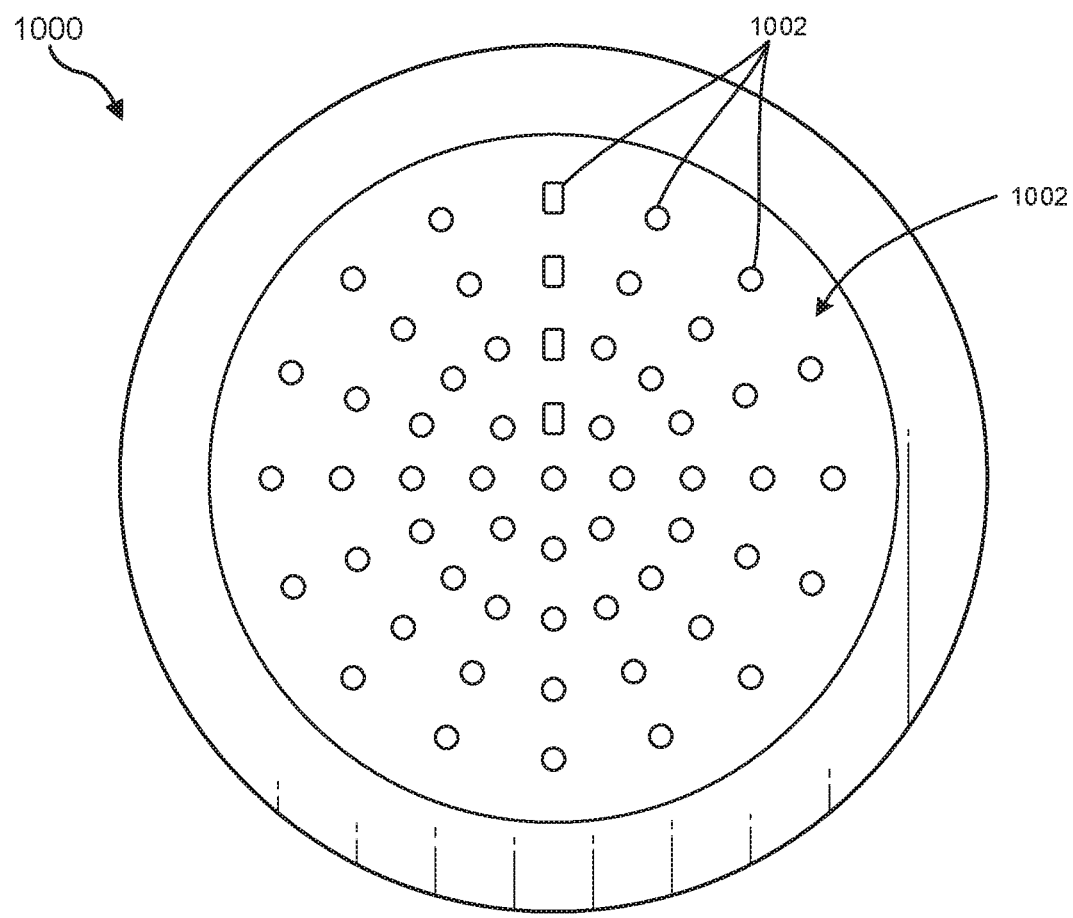
FIG. 11 is a top view of the lower matrix material of FIG. 10.

FIG. 10 is a side cross-sectional view of a lower matrix material 1000 for use with systems for preparing cytological samples (e.g., with the systems 200, 600, 700 described above), according to at least one embodiment of the present disclosure. FIG. 11 is a top view of the lower matrix material 1000 of FIG. 10. As discussed above, the lower matrix material 1000 may be or include a pre-formed (e.g., pre-gelled) sectionable matrix material. The lower matrix material 1000 may include a central depression 1002, within which a concave filter may be positioned for a filtering operation. A plurality of channels 1004 may extend from an inner surface 1006 of the central depression 1002 to a bottom surface 1008 of the lower matrix material 1000, providing fluid communication across the lower matrix material 1000. Thus, when the lower matrix material 1000 is positioned within a corresponding receptacle (e.g., the receptacle 704 shown in FIG. 9), a negative pressure may be applied to the central depression 1002 via the channels 1004.

The channels 1004 may be distributed across the inner surface 1006 of the central depression 1002, such that a substantially consistent pressure may be applied across the inner surface 1006. This may facilitate the deposition of cellular material in a cytological sample substantially evenly across a concave filter positioned within the central depression 1002. As shown in FIG. 11, at least some of the channels 1004 may have different cross-sectional shapes (e.g., circular and rectangular) and/or sizes. For example, the variety of cross-sectional shapes and/or sizes of the channels 1004 may facilitate obtaining a proper or known orientation of a section or slide obtained from a corresponding pathological cell block.

Figure 12:
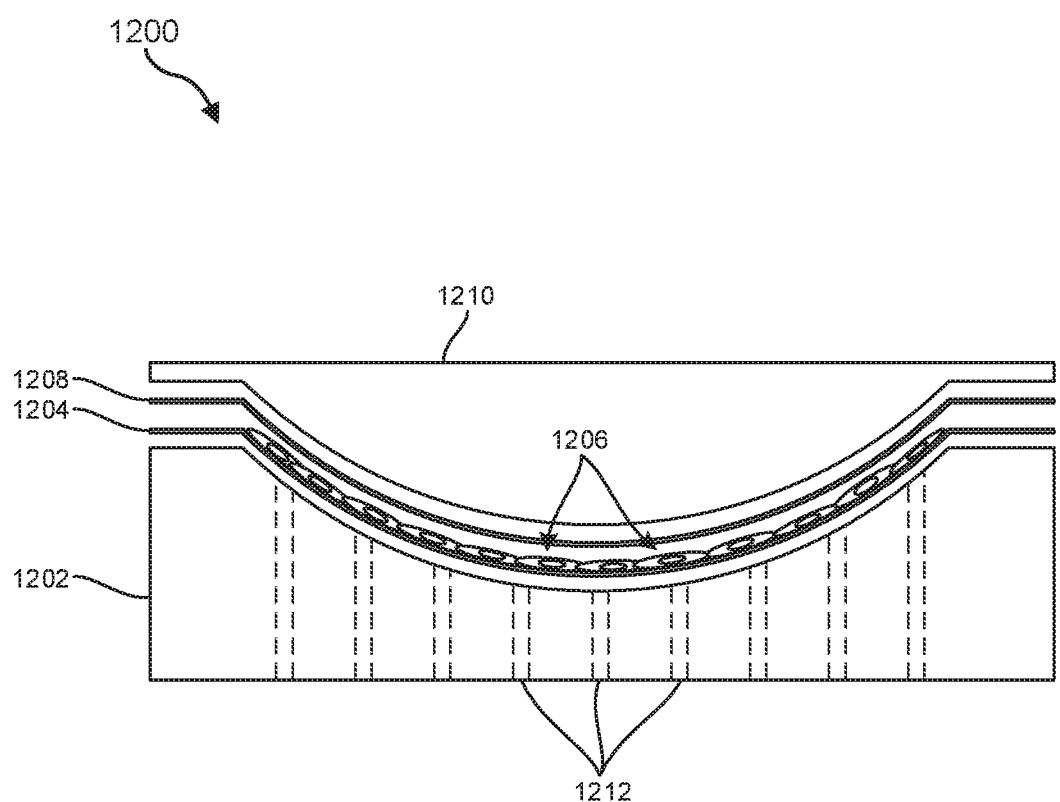
FIG. 12 is a side cross-sectional view of an assembly including a lower matrix material and an upper matrix material for use with systems for preparing cytological samples, with a lower filter, a cellular sample, and an upper filter positioned between the lower and upper matrix materials, according to at least one embodiment of the present disclosure.

FIG. 12 is a side cross-sectional view of an assembly 1200 including a lower matrix material 1202, a first (e.g., lower) concave filter 1204, a filtered cellular material 1206, a second (e.g., upper) concave filter 1208, and an upper matrix material 1210 for use with systems for preparing cytological samples, according to at least one embodiment of the present disclosure. As discussed above with reference to FIGS. 10 and 11, the lower matrix material 1202 may include channels 1212 extending therethrough.

The assembly 1200 may be formed by positioning the lower matrix material 1202 in a corresponding receptacle of a vacuum device (e.g., the receptacle 704 of the system 700 discussed above with reference to FIGS. 7-9) and placing the first concave filter 1204 over the lower matrix material 1202. A cytological sample (e.g., a liquid solution including a suspension of cellular material) may be applied to the first concave filter 1204, and a negative pressure may be applied through the channels 1212. The filtered cellular material 1206 may be deposited on the first concave filter 1204 substantially evenly across a concave surface of the concave filter 1204. Optionally, the second concave filter 1208 may be positioned over the filtered cellular material 1206, such as to hold the filtered cellular material 1206 in place during subsequent handling. The upper matrix material 1210 may be applied over the filtered cellular material 1206 (and over the second concave filter 1208, if present). For example, a liquid upper matrix material 1210 may be applied and hardened, or a pre-formed (e.g., pre-gelled) upper matrix material 1210 may be disposed over the filtered cellular material 1206. The assembly 1200 may then be submitted for further histological processing.

Figure 13A:
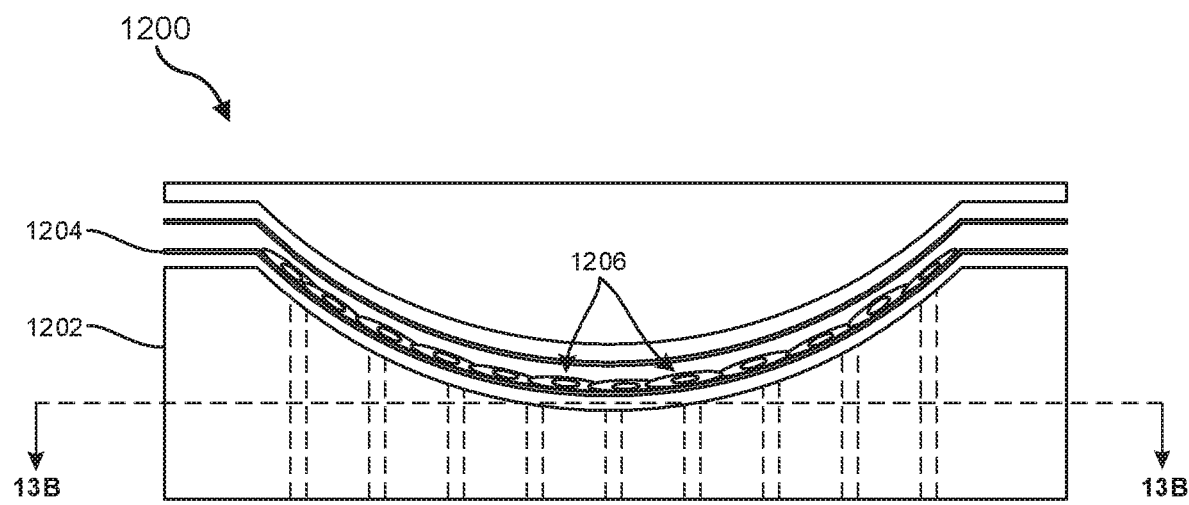
FIG. 13A is a side cross-sectional view of the assembly of FIG. 12, showing a location where a first section may be taken at line 13B-13B.
Figure 13B:
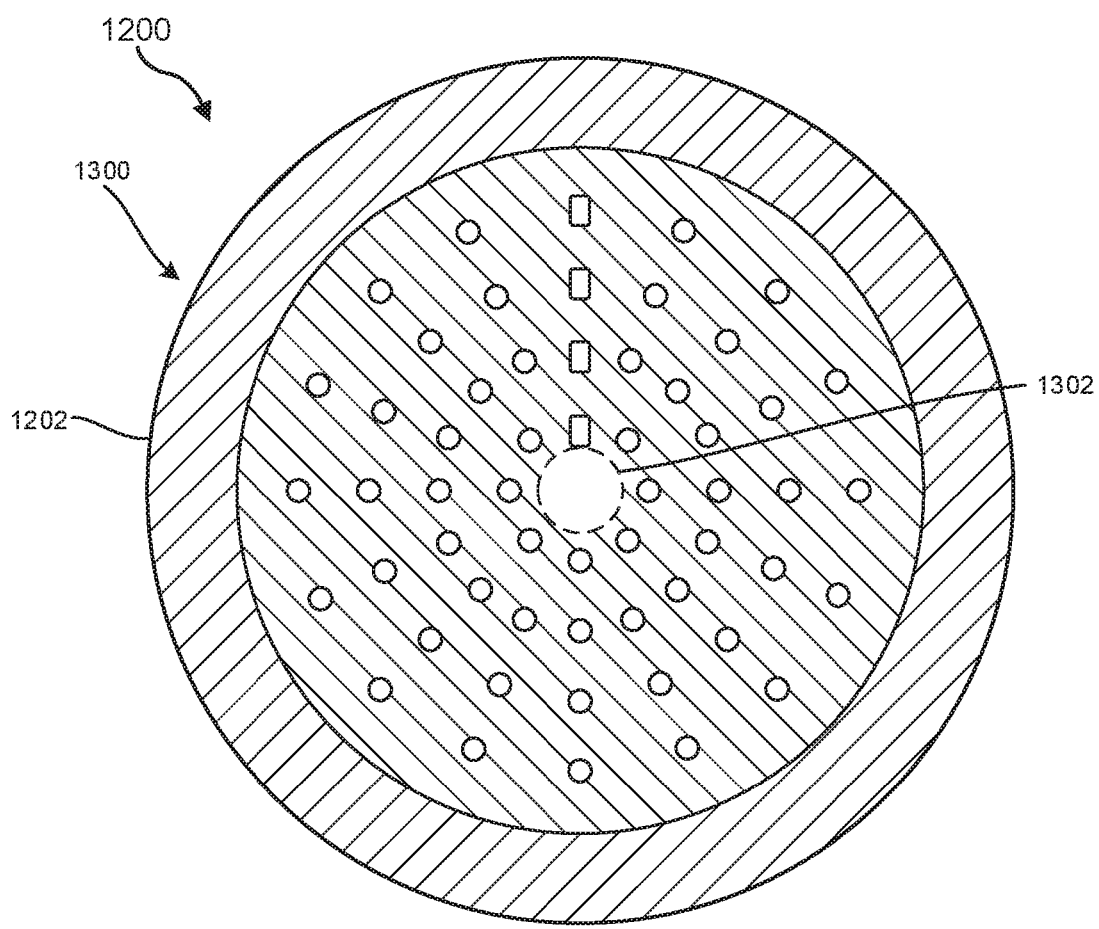
FIG. 13B is a top cross-sectional view of the assembly of FIG. 13A, showing an appearance of the first section taken at line 13B-13B.

FIG. 13A is a side cross-sectional view of the assembly 1200 of FIG. 12, showing a location where a first section 1300 may be taken at line 13B-13B. FIG. 13B is a top cross-sectional view of the assembly 1200 of FIG. 13A, showing an appearance of the first section 1300 taken at line 13B-13B. The first section 1300 may be taken at a lower portion of the inner concave surface of the lower matrix material 1202. As shown in FIG. 13B, a small central region 1302 may be evident in the first section 1300 where the assembly 1200 was cut just at or above the lower matrix material 1202. However, the filtered cellular material 1206 may not have been reached by the first section 1300, such that none of the filtered cellular material 1206 is present in the first section 1300. Since no filtered cellular material 1206 is present in the first section 1300, the first section 1300 may be discarded prior to further histological processing.

Figure 14A:
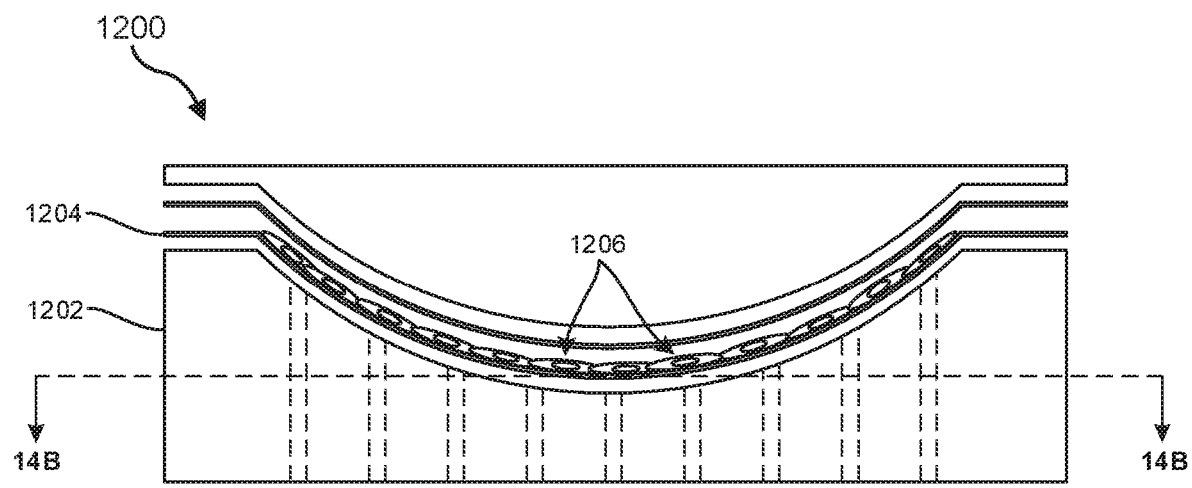
FIG. 14A is a side cross-sectional view of the assembly of FIG. 12, showing a location where a second section may be taken at line 14B-14B.
Figure 14B:
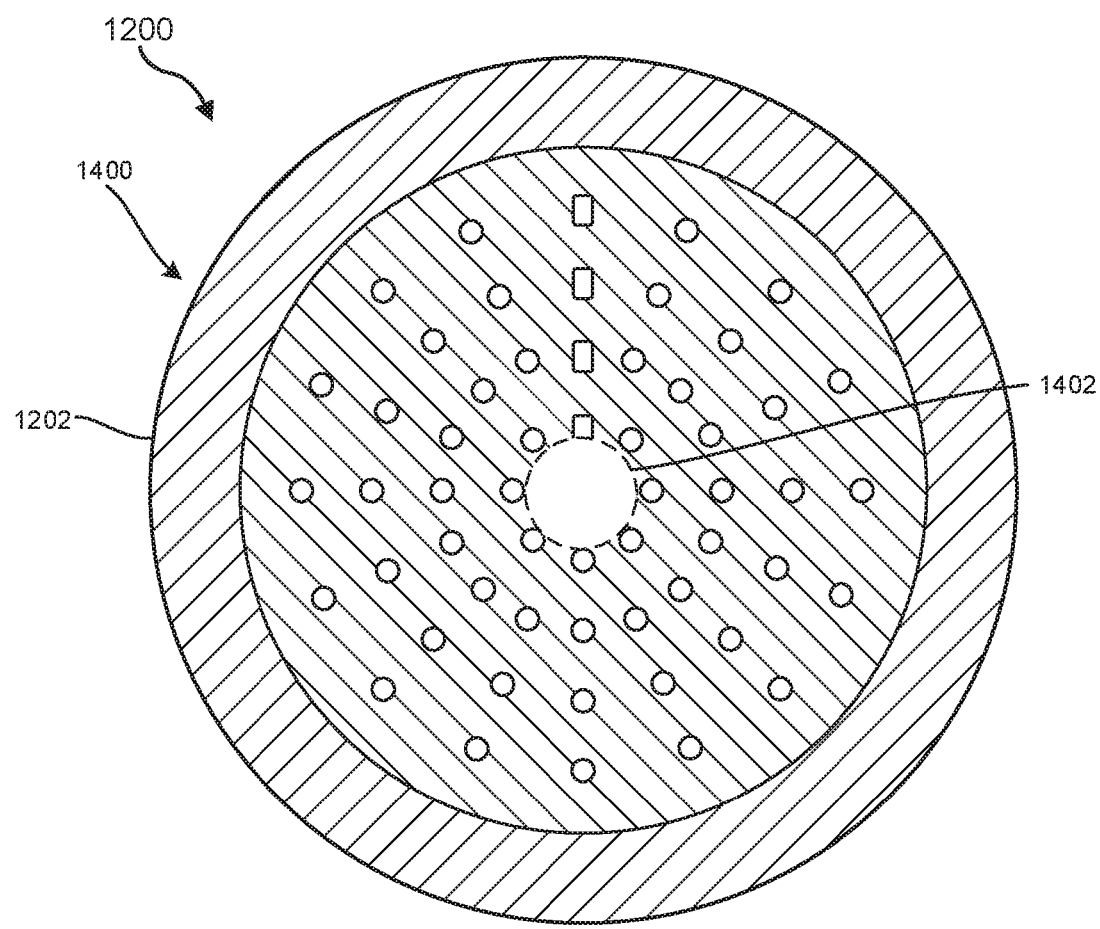
FIG. 14B is a top cross-sectional view of the assembly of FIG. 14A, showing an appearance of the second section taken at line 14B-14B.

FIG. 14A is a side cross-sectional view of the assembly 1200 of FIG. 12, showing a location where a second section 1400 may be taken at line 14B-14B. FIG. 14B is a top cross-sectional view of the assembly 1200 of FIG. 14A, showing an appearance of the second section 1400 taken at line 14B-14B. The second section 1400 may be taken just above the lower portion of the inner concave surface of the lower matrix material 1202, such as just reaching the first concave filter 1204. As shown in FIG. 14B, a slightly larger (compared to FIG. 13B) central region 1402 may be evident in the second section 1400 where the assembly 1200 was cut just at the first concave filter 1204. However, the filtered cellular material 1206 may not have been reached by the second section 1400, such that none of the filtered cellular material 1206 is present in the first section 1400. Since no filtered cellular material 1206 is present in the second section 1400, the second section 1400 may be discarded prior to further histological processing. However, the second section 1400 may provide an indication to the technician obtaining the second section 1400 that the filtered cellular material 1206 may soon be present in subsequent sections.

Figure 15A:
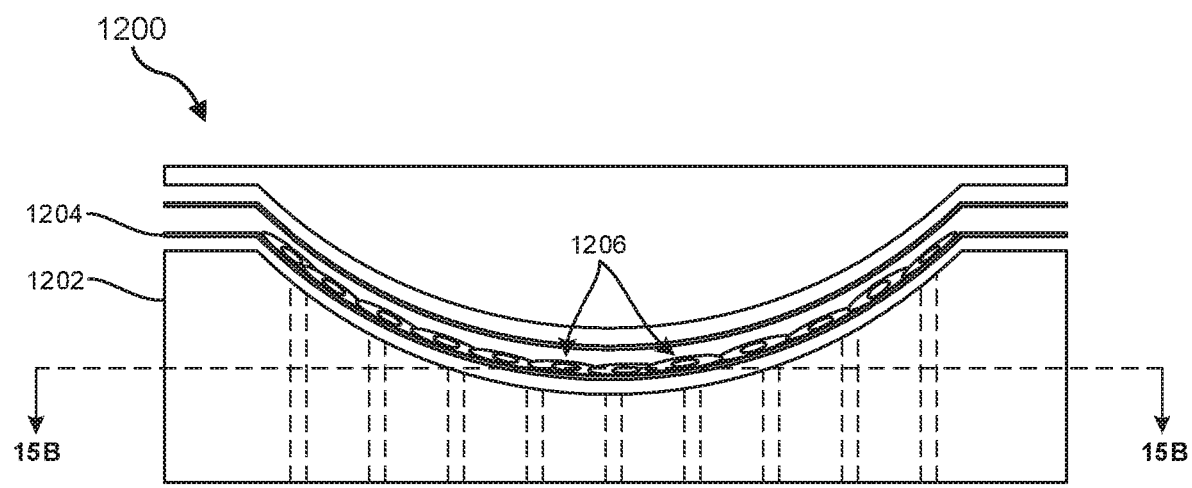
FIG. 15A is a side cross-sectional view of the assembly of FIG. 12, showing a location where a third section may be taken at line 15B-15B.
Figure 15B:
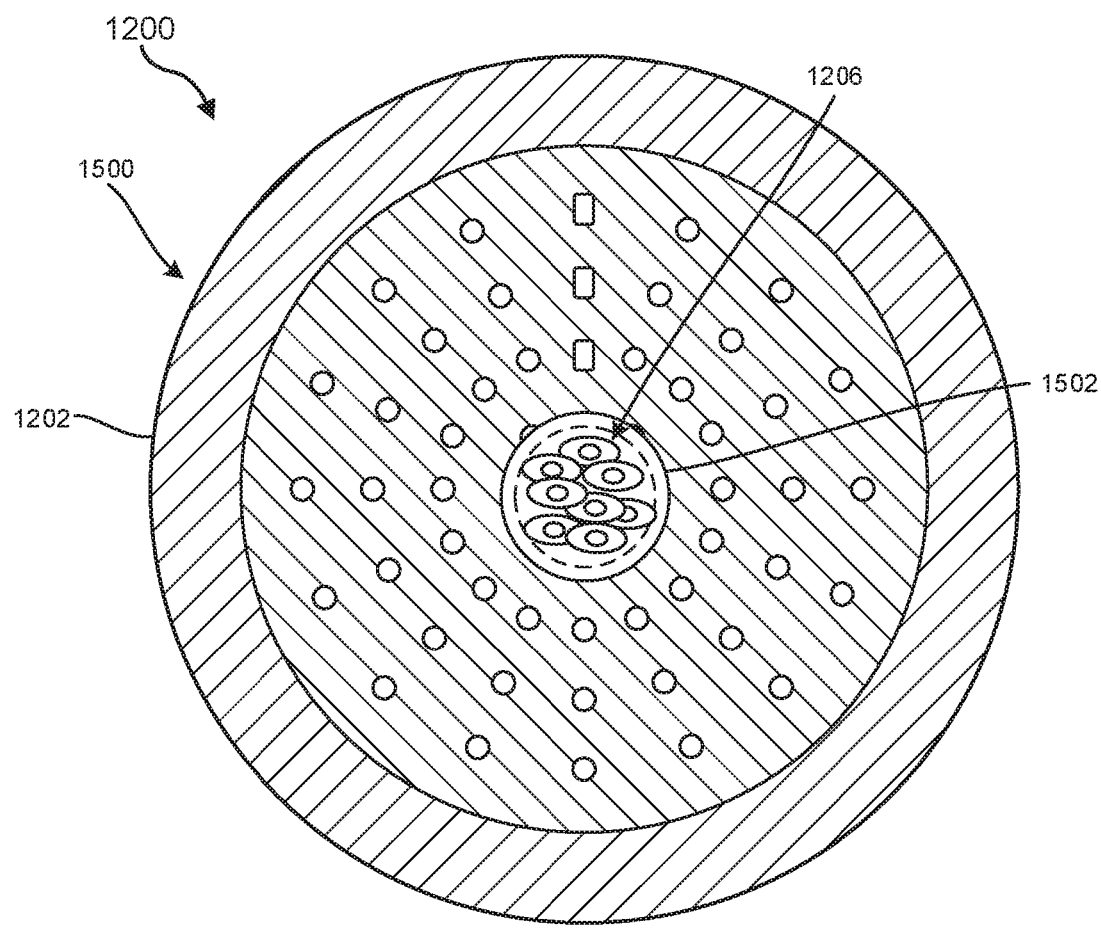
FIG. 15B is a top cross-sectional view of the assembly of FIG. 15A, showing an appearance of the third section taken at line 15B-15B.

FIG. 15A is a side cross-sectional view of the assembly 1200 of FIG. 12, showing a location where a third section 1500 may be taken at line 15B-15B. FIG. 15B is a top cross-sectional view of the assembly 1200 of FIG. 15A, showing an appearance of the third section 1500 taken at line 15B-15B. The third section 1500 may be taken just above the lower portion of the first concave filter 1204, such as just reaching a lower portion of the filtered cellular material 1206 within a bottom of the first concave filter 1204. As shown in FIG. 15B, a disk 1502 of the filtered cellular material 1206 may be evident in the third section 1500. The third section 1500 may represent a lowest section that may be suitable for diagnostic review by a pathologist, for example.

Figure 16A:
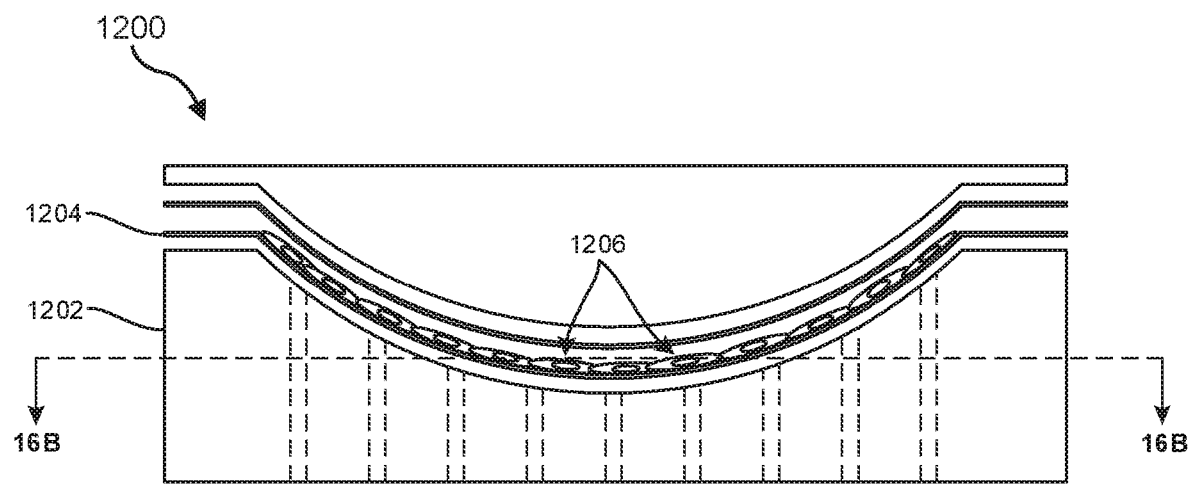
FIG. 16A is a side cross-sectional view of the assembly of FIG. 12, showing a location where a fourth section may be taken at line 16B-16B.
Figure 16B:
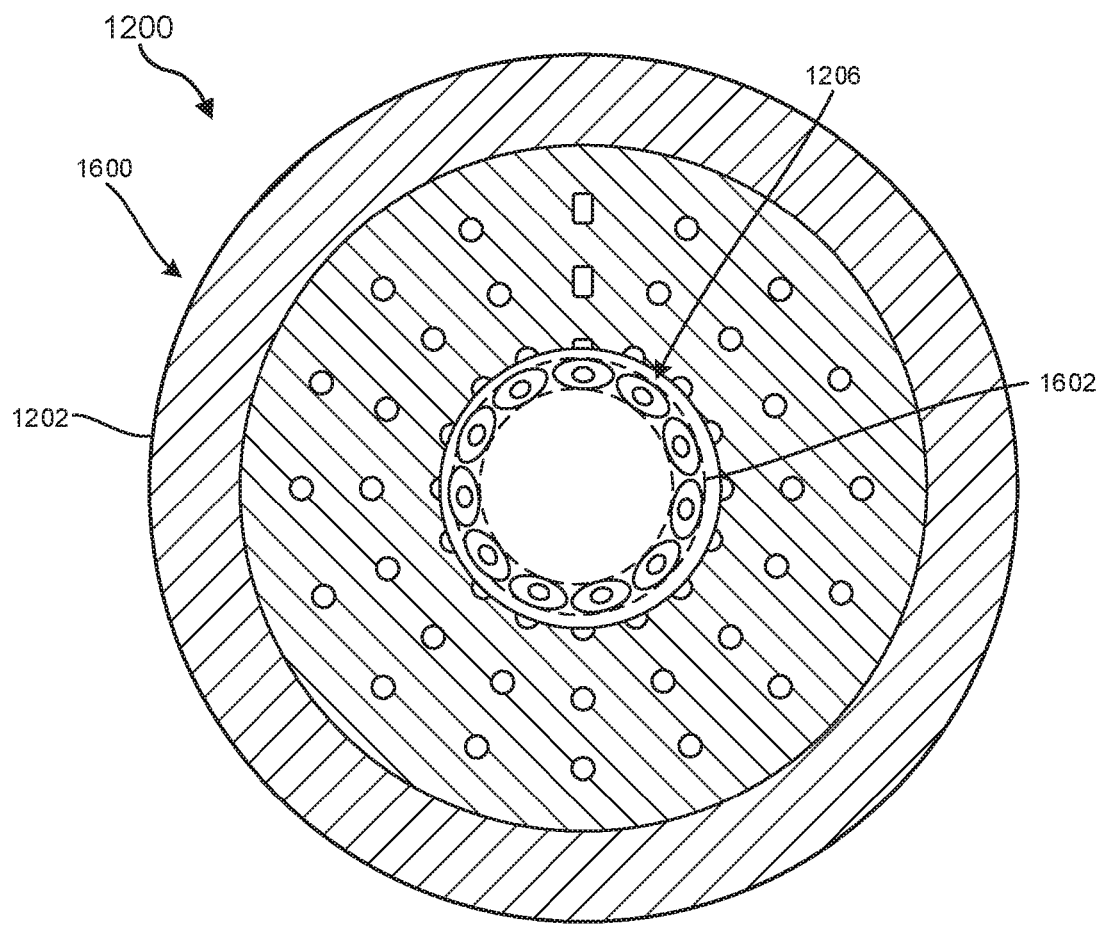
FIG. 16B is a top cross-sectional view of the assembly of FIG. 16A, showing an appearance of the fourth section taken at line 16B-16B.

FIG. 16A is a side cross-sectional view of the assembly 1200 of FIG. 12, showing a location where a fourth section 1600 may be taken at line 16B-16B. FIG. 16B is a top cross-sectional view of the assembly 1200 of FIG. 16A, showing an appearance of the fourth section 1600 taken at line 16B-16B. The fourth section 1600 may be taken above a lowest layer of filtered cellular material 1206 within the first concave filter 1204. As shown in FIG. 16B, a circular ring 1602 of the filtered cellular material 1206 may be evident in the fourth section 1600.

Figure 17A:
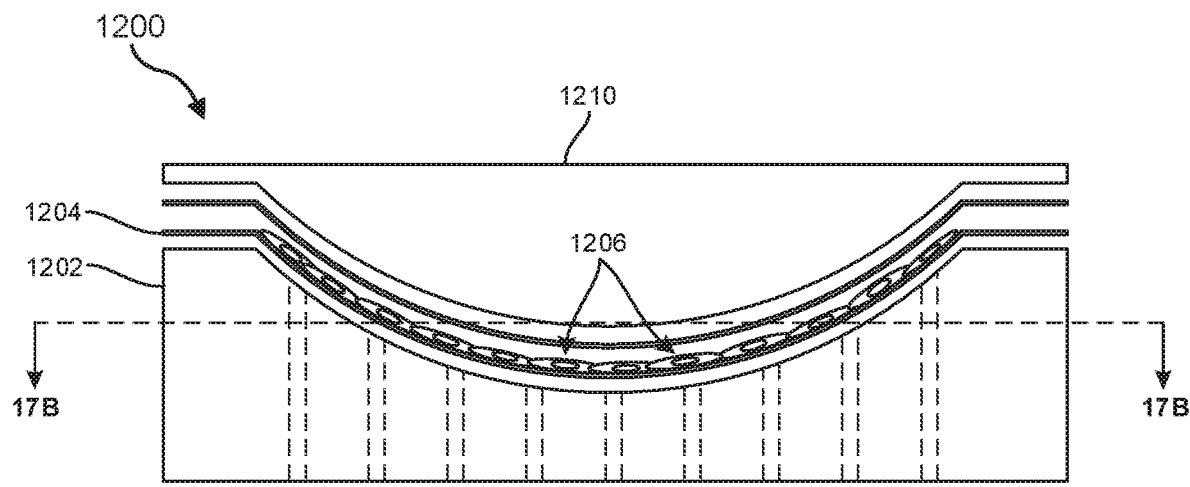
FIG. 17A is a side cross-sectional view of the assembly of FIG. 12, showing a location where a fifth section may be taken at line 17B-17B.
Figure 17B:
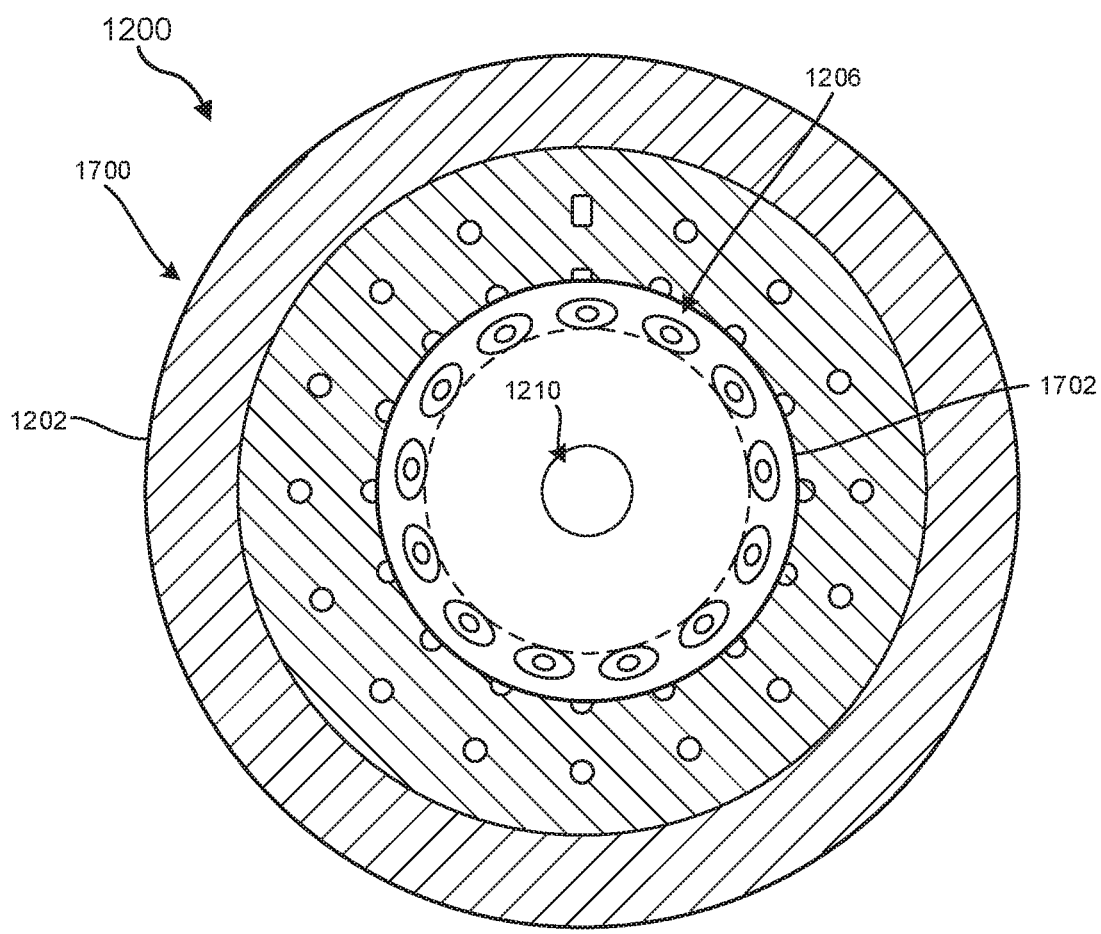
FIG. 17B is a top cross-sectional view of the assembly of FIG. 17A, showing an appearance of the fifth section taken at line 17B-17B.

FIG. 17A is a side cross-sectional view of the assembly 1200 of FIG. 12, showing a location where a fifth section 1700 may be taken at line 17B-17B. FIG. 17B is a top cross-sectional view of the assembly 1200 of FIG. 17A, showing an appearance of the fifth section 1700 taken at line 17B-17B. The fifth section 1700 may be taken through a lower portion of the upper matrix material 1210. As shown in FIG. 17B, a circular ring 1702 of the filtered cellular material 1206 may be evident in the fifth section 1700. A central portion of the upper matrix material 1210 may also be evident in the fifth section 1700.

Figure 18A:
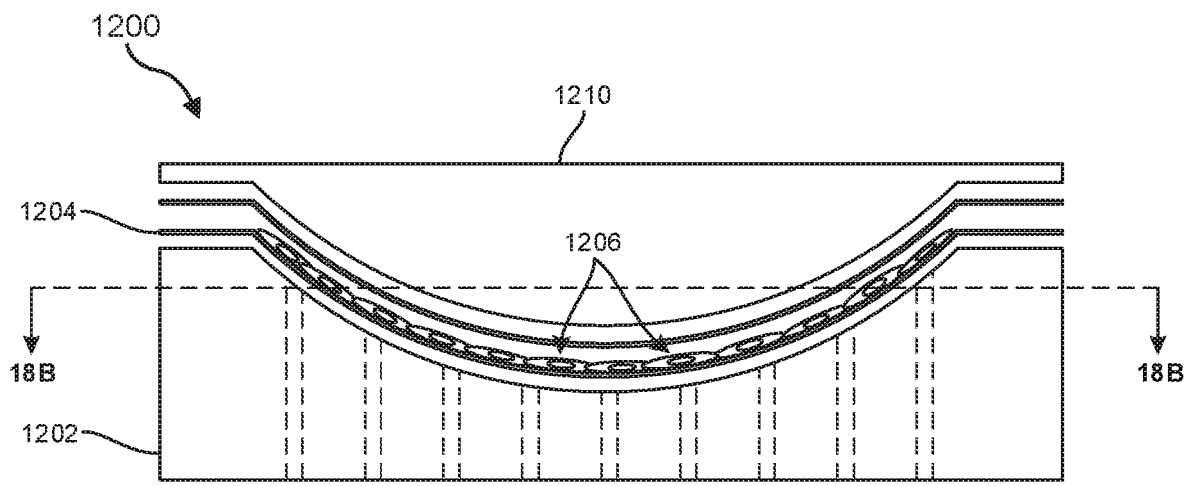
FIG. 18A is a side cross-sectional view of the assembly of FIG. 12, showing a location where a sixth section may be taken at line 18B-18B.
Figure 18B:
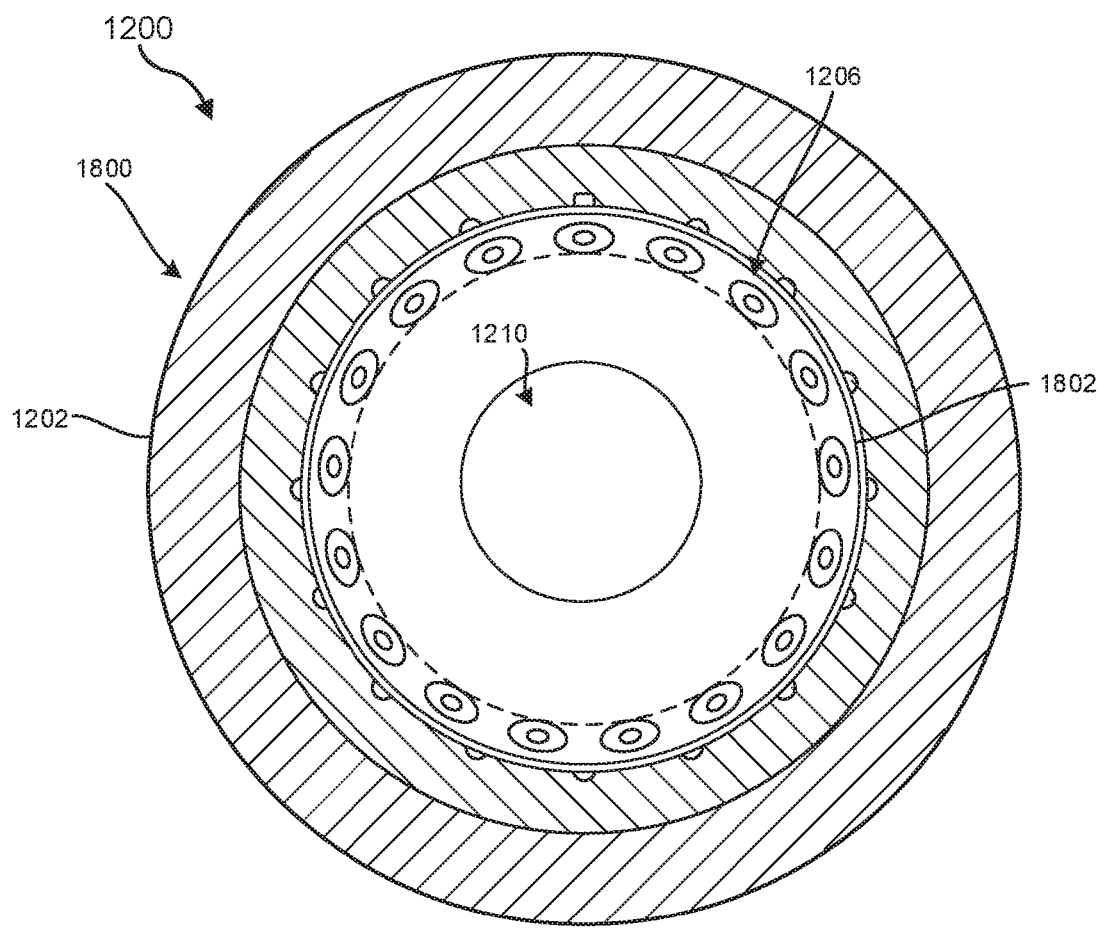
FIG. 18B is a top cross-sectional view of the assembly of FIG. 18A, showing an appearance of the sixth section taken at line 18B-18B.

FIG. 18A is a side cross-sectional view of the assembly 1200 of FIG. 12, showing a location where a sixth section 1800 may be taken at line 18B-18B. FIG. 18B is a top cross-sectional view of the assembly 1200 of FIG. 18A, showing an appearance of the sixth section 1800 taken at line 18B-18B. The sixth section 1800 may be taken near a top of the lower matrix material 1202. As shown in FIG. 18B, a circular ring 1802 of the filtered cellular material 1206 may be evident in the sixth section 1800. A larger (compared to FIG. 17B) central portion of the upper matrix material 1210 may also be evident in the sixth section 1800.

Accordingly, the concave shape of the filtered cellular material 1206, due to deposition on the inner surface of the first concave filter 1204, may enable a plurality of sequential sections to be obtained from the assembly 1200, each of which may include portions of the filtered cellular material 1206.

Figure 19:
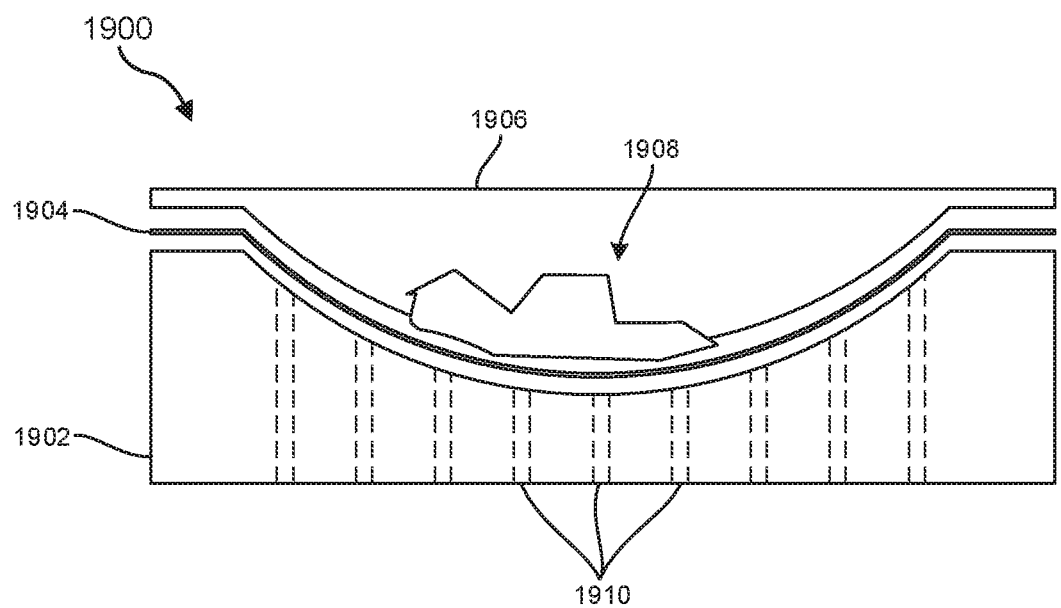
FIG. 19 is a side cross-sectional view of an assembly including a lower matrix material and an upper matrix material for use with systems for preparing cytological samples, with a filter and a tissue sample positioned between the lower and upper matrix materials, according to at least one embodiment of the present disclosure.

FIG. 19 is a side cross-sectional view of an assembly 1900 including a lower matrix material 1902, a concave filter 1904, and an upper matrix material 1906 for use with systems for preparing cytological samples, according to at least one embodiment of the present disclosure. A tissue sample 1908 is illustrated as being positioned between the lower matrix material 1902 and the upper matrix material 1906 (e.g., within an inner cavity of the concave filter 1904). The tissue sample 1908 may be a biopsy or brushing, rather than a cellular material obtained from a cellular suspension in a liquid as discussed above. For example, the tissue sample 1908 may be a biopsy that was removed from an organ of a patient and placed in a liquid. To remove the liquid and form a cell block, the assembly 1900 may be used in connection with a system for preparing cytological samples, as described herein. For example, the lower matrix material 1902 may include channels 1910 through which a negative pressure may be applied to withdraw liquid. The upper matrix material 1906 may then be applied over the tissue sample 1908. For example, the upper matrix material may initially be liquid that is hardened, or the upper matrix material 1906 may be pre-formed (e.g., pre-gelled). Accordingly, embodiments of the present disclosure may be used to form cell blocks for low-concentration cellular suspensions or bulk tissue samples, such as the tissue sample 1908.

Figure 20:
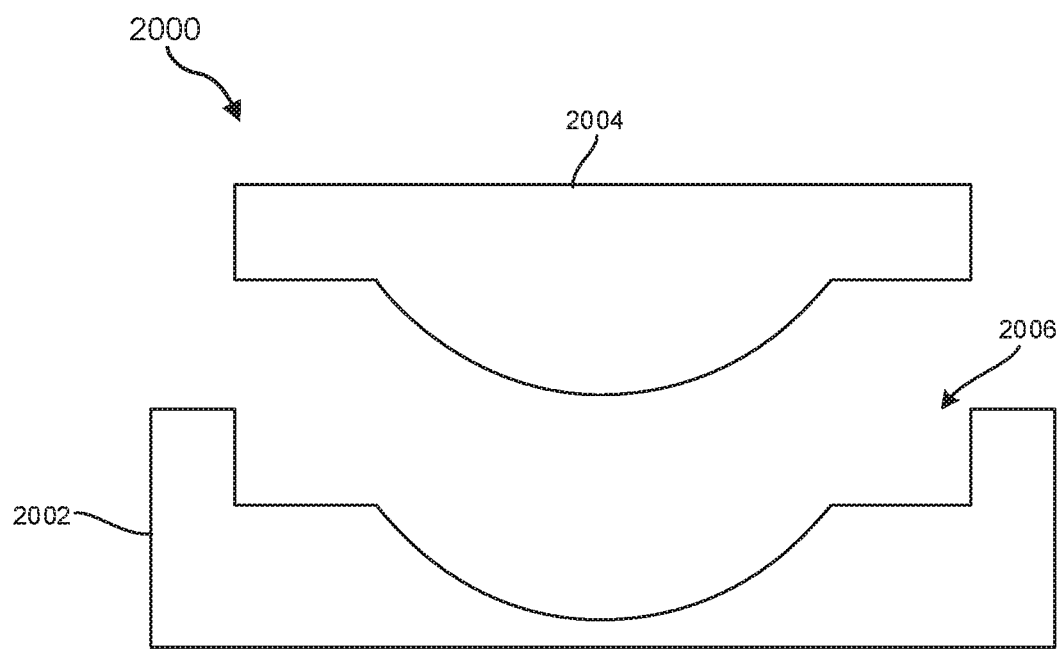
FIG. 20 is an exploded side cross-sectional view of a matrix assembly including a lower matrix material and an upper matrix material, according to at least one embodiment of the present disclosure.

FIG. 20 is an exploded side cross-sectional view of a matrix assembly 2000 including a lower matrix material 2002 and an upper matrix material 2004, according to at least one embodiment of the present disclosure. As shown in FIG. 20, the lower matrix material 2002 may have a central concave depression 2006, and the upper matrix material 2004 may be shaped and sized to be complementary to (e.g., to fit within) the central concave depression 2006.

Figure 21:
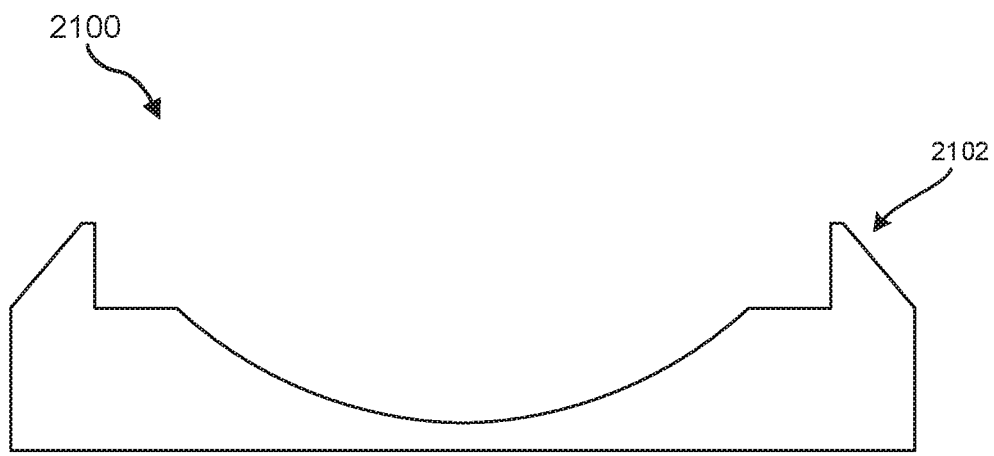
FIG. 21 is a side cross-sectional view of a lower matrix material, according to at least one embodiment of the present disclosure.

FIG. 21 is a side cross-sectional view of a lower matrix material 2100, according to at least one embodiment of the present disclosure. As shown in FIG. 21, an upper perimeter 2102 of the lower matrix material 2100 may be chamfered in cross-section, such as to provide relief to facilitate placement and/or removal of a corresponding upper matrix material.

Figure 22:
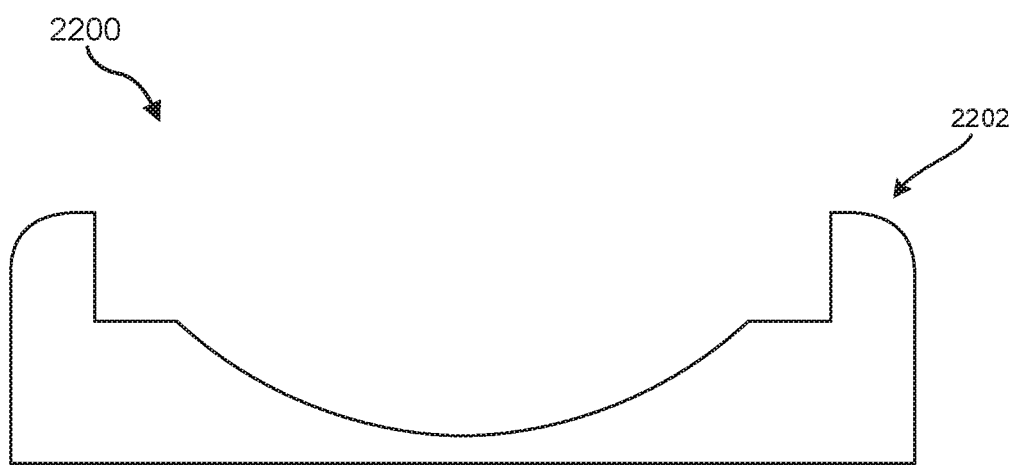
FIG. 22 is a side cross-sectional view of a lower matrix material, according to at least one additional embodiment of the present disclosure.

FIG. 22 is a side cross-sectional view of a lower matrix material 2200, according to at least one additional embodiment of the present disclosure. As shown in FIG. 22, an upper perimeter 2202 of the lower matrix material 2200 may be rounded in cross section, such as to facilitate handling of the lower matrix material 2200.

Figure 23A:
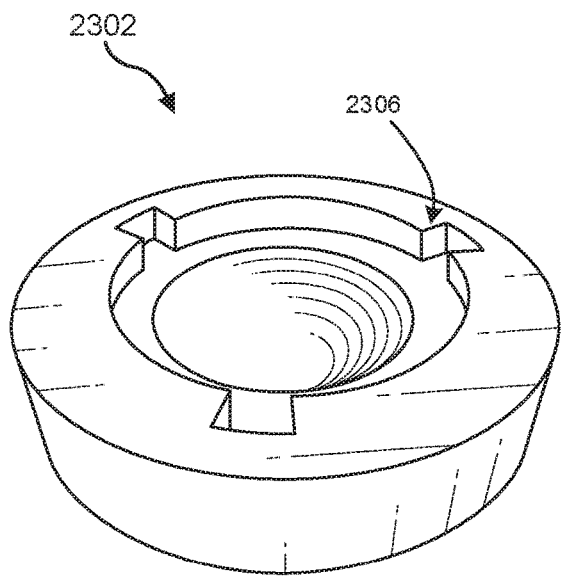
FIG. 23A is an upper perspective view of a lower matrix material, according to at least one further embodiment of the present disclosure.
Figure 23B:
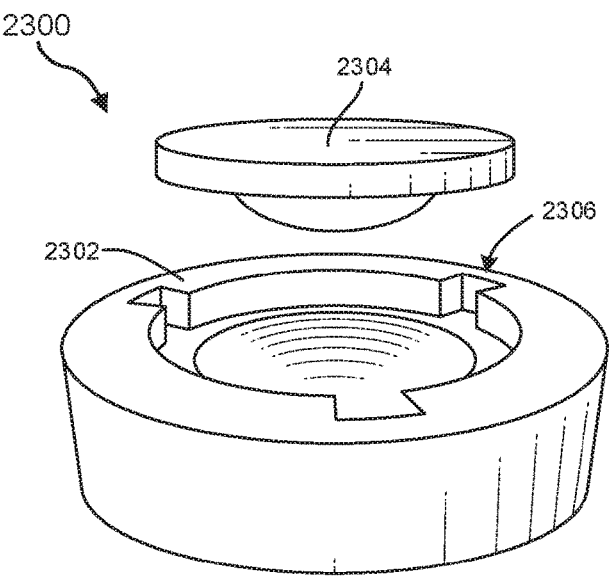
FIG. 23B is an upper perspective view of an exploded matrix assembly, including a lower matrix material and an upper matrix material, according to at least one embodiment of the present disclosure.
Figure 23C:
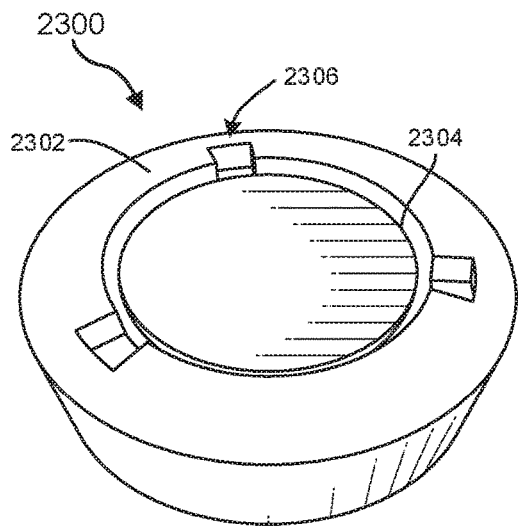
FIG. 23C is an upper perspective view of the matrix assembly of FIG. 23B when the lower matrix material and the upper matrix material are assembled together, according to at least one embodiment of the present disclosure.
Figure 23D:
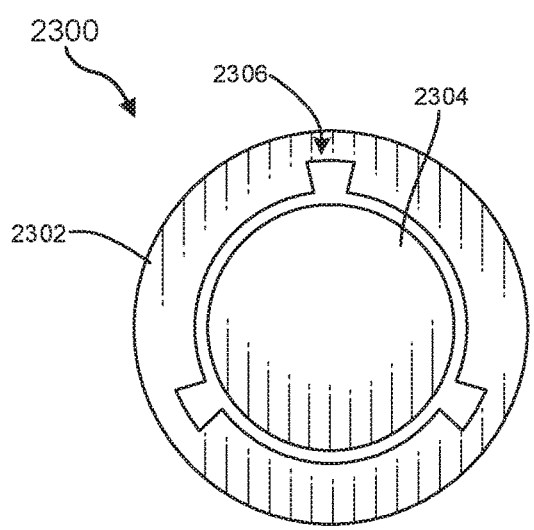
FIG. 23D is a top view of the assembled matrix assembly of FIG. 23C.

FIG. 23A is an upper perspective view of a lower matrix material 2302, according to at least one further embodiment of the present disclosure. FIG. 23B is an upper perspective view of an exploded matrix assembly 2300, including the lower matrix material 2302 and an upper matrix material 2304, according to at least one embodiment of the present disclosure. FIG. 23C is an upper perspective view of the matrix assembly 2300 of FIG. 23B when the lower matrix material 2302 and the upper matrix material 2304 are assembled together, according to at least one embodiment of the present disclosure. FIG. 23D is a top view of the assembled matrix assembly 2300 of FIG. 23C. As shown in FIGS. 23A-23D, in some examples, the lower matrix material 2302 may include one or more radial recesses 2306, such as to facilitate proper placement and/or removal of the upper matrix material 2304.

Figure 24:
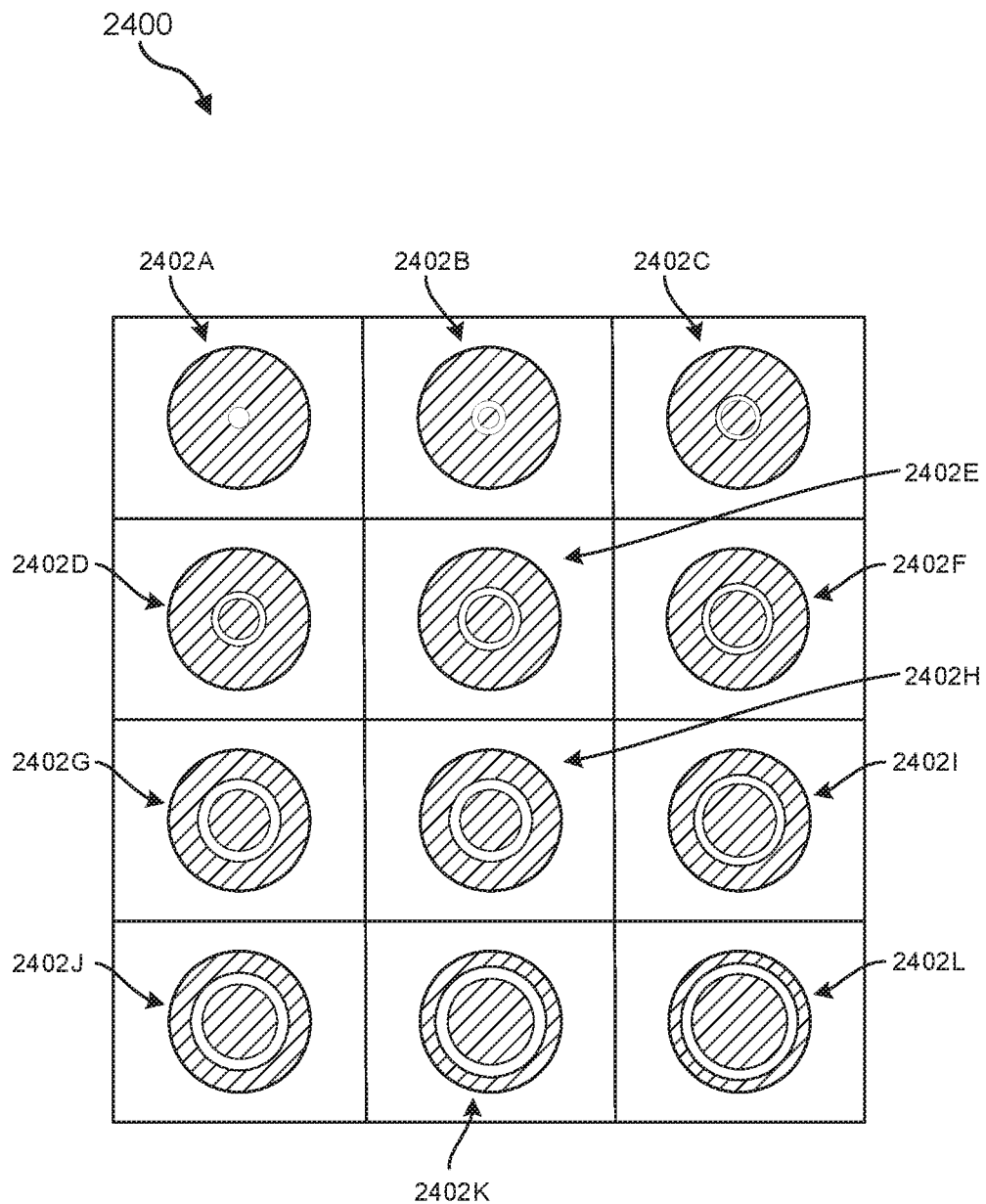
FIG. 24 is a top view of a prepared tissue sample slide including twelve example sections of a matrix assembly, according to at least one embodiment of the present disclosure.

FIG. 24 is a top view of a prepared tissue sample slide including twelve example sections 2402A-2402L of a matrix assembly, according to at least one embodiment of the present disclosure. As shown in FIG. 24, the sections 2402A-2402L are substantially circular, with a disk or circle of cellular material between or adjacent to portions of upper and lower matrix materials. The cellular material may be simple to locate due to the distinct boundaries between the matrix materials and the portions of the sections 2402A-2402L that may contain the cellular material.

Accordingly, disclosed are systems and methods for cytological processing that involve the use of a concave filter to deposit cellular material in a concave configuration. The concave configuration may facilitate obtaining multiple cellular sections for histological review and diagnosis, as described above.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method for preparing cytological samples, the method comprising:
   placing a cytological sample in a concave filter in a filtration system;
   applying a negative pressure to an outer side of the concave filter with a vacuum device to withdraw a liquid from the cytological sample and to maintain a filtered cellular material on an inner surface of the concave filter;
   positioning a lower sectionable matrix material under the concave filter prior to applying the negative pressure to the outer side of the concave filter;
   applying an upper sectionable matrix material over the filtered cellular material within the concave filter; and
   removing an assembly including the filtered cellular material and the sectionable matrix material from the filtration system.

2. The method of claim 1, wherein applying the upper sectionable matrix material over the filtered cellular material comprises applying a liquid or molten upper sectionable matrix material over the filtered cellular material.

3. The method of claim 2, further comprising hardening the upper sectionable matrix material to form the assembly including the filtered cellular material and the upper sectionable matrix material.

4. The method of claim 1, wherein applying the upper sectionable matrix material over the filtered cellular material comprises applying a pre-formed and pre-shaped upper sectionable matrix material over the filtered cellular material.

5. The method of claim 1, wherein the lower sectionable matrix material comprises channels extending between opposing surfaces thereof.

6. The method of claim 5, wherein applying the negative pressure to the outer side of the concave filter comprises applying the negative pressure through the channels in the lower sectionable matrix material.

7. The method of claim 1, further comprising positioning an additional concave filter over the filtered cellular material prior to applying the upper sectionable matrix material over the filtered cellular material.

8. A method for preparing cytological samples, the method comprising:
   placing a cytological sample in a concave filter in a filtration system;
   applying a negative pressure to an outer side of the concave filter with a vacuum device to withdraw a liquid from the cytological sample and to maintain a filtered cellular material on an inner surface of the concave filter;

applying a sectionable matrix material over the filtered cellular material within the concave filter, wherein applying the sectionable matrix material over the filtered cellular material comprises applying a liquid or molten sectionable matrix material over the filtered cellular material; and removing an assembly including the filtered cellular material and the sectionable matrix material from the filtration system.

9. The method of claim 8, further comprising hardening the sectionable matrix material to form the assembly including the filtered cellular material and the sectionable matrix material.

10. The method of claim 8, further comprising positioning an additional concave filter over the filtered cellular material prior to applying the sectionable matrix material over the filtered cellular material.

11. A method for preparing cytological samples, the method comprising:

placing a cytological sample in a concave filter in a filtration system;

applying a negative pressure to an outer side of the concave filter with a vacuum device to withdraw a liquid from the cytological sample and to maintain a filtered cellular material on an inner surface of the concave filter;

positioning an additional concave filter over the filtered cellular material;

after positioning the additional concave filter over the filtered cellular material applying a sectionable matrix material over the filtered cellular material within the concave filter and over the additional concave filter; and removing an assembly including the filtered cellular material and the sectionable matrix material from the filtration system.

* * * * *